United States Patent
Tsujioka et al.

(10) Patent No.: US 10,175,834 B2
(45) Date of Patent: Jan. 8, 2019

(54) POSITION INPUT DEVICE AND DISPLAY DEVICE

(71) Applicant: Sharp Kabushiki Kaisha, Osaka-shi, Osaka (JP)

(72) Inventors: Tomotoshi Tsujioka, Osaka (JP); Shinichi Miyazaki, Osaka (JP); Kohji Yabuta, Osaka (JP); Mikihiro Noma, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 44 days.

(21) Appl. No.: 15/102,938

(22) PCT Filed: Jan. 8, 2015

(86) PCT No.: PCT/JP2015/050324
§ 371 (c)(1),
(2) Date: Jun. 9, 2016

(87) PCT Pub. No.: WO2015/107969
PCT Pub. Date: Jul. 23, 2015

(65) Prior Publication Data
US 2016/0299603 A1 Oct. 13, 2016

(30) Foreign Application Priority Data

Jan. 15, 2014 (JP) .................................. 2014-005008

(51) Int. Cl.
G06F 3/045 (2006.01)
G06F 3/041 (2006.01)
G06F 3/044 (2006.01)

(52) U.S. Cl.
CPC .... *G06F 3/044* (2013.01); *G06F 2203/04103* (2013.01)

(58) Field of Classification Search
CPC .............................. G06F 3/044; G06F 3/0416
See application file for complete search history.

(56) References Cited

U.S. PATENT DOCUMENTS

| | | | | |
|---|---|---|---|---|
| 2006/0290869 A1* | 12/2006 | Suzuki | ............. | G02F 1/134363 349/143 |
| 2012/0268418 A1 | 10/2012 | Ishizaki et al. | | |
| 2012/0274603 A1* | 11/2012 | Kim | ...................... | G06F 3/0412 345/174 |
| 2014/0062955 A1* | 3/2014 | Hotelling | .............. | G06F 3/0416 345/174 |
| 2014/0085214 A1* | 3/2014 | Cok | ........................ | G06F 3/044 345/173 |
| 2014/0085256 A1 | 3/2014 | Chen et al. | | |

(Continued)

FOREIGN PATENT DOCUMENTS

| | | |
|---|---|---|
| CN | 103092442 A | 5/2013 |
| CN | 103235663 A | 8/2013 |
| JP | 2012-226687 A | 11/2012 |

*Primary Examiner* — Nan-Ying Yang
(74) *Attorney, Agent, or Firm* — Keating & Bennett, LLP

(57) ABSTRACT

A touch panel (a position input device) includes a trace group including traces arranged at intervals, and an electrode portion including a driving electrode and a detection electrode. The traces, the driving electrode, and the detection electrode are made of a light transmissive conductive film. The driving electrode and the detection electrode are arranged adjacent to the trace group and include a slit extending along the traces.

14 Claims, 19 Drawing Sheets

(56) References Cited

U.S. PATENT DOCUMENTS

| | | | |
|---|---|---|---|
| 2014/0111707 A1* | 4/2014 | Song | G06F 3/044 349/12 |
| 2015/0169112 A1 | 6/2015 | Chen et al. | |
| 2015/0227228 A1 | 8/2015 | Ishizaki et al. | |

* cited by examiner

POSITION INPUT DEVICE AND DISPLAY DEVICE

TECHNICAL FIELD

The present invention relates to a position input device and a display device.

BACKGROUND ART

In recent years, liquid crystal display devices using a touch panel has been installed in electronic devices such as tablet-type laptop computers and portable information terminals for improving operability and usability. A touch panel has light transmissive properties and position information within a plane display surface of a liquid crystal panel is input via the touch panel with being touched by a finger or a touch pen. Accordingly, a user can directly operate the panel as if a user directly touches images displayed on the liquid crystal panel. An example of such a display device including the touch panel as described in following Patent Document 1 has been known.

RELATED ART DOCUMENT

Patent Document

Patent Document 1: Japanese Unexamined Patent Application Publication No. 2012-226687

Problem to be Solved by the Invention

The display device including the touch panel described in Patent Document 1 has a following configuration. The electrode layer includes a first area and a second area that are defined alternately in a first direction. First slits extend in a second direction in the first area and the second area and the adjacent first slits are communicated with each other by a second slit in the second area. Accordingly, the electrode layer is less likely to be seen.

However, the electrode layer is made of a light transmissive conductive film and may include a tapered surface on an outer edge thereof due to manufacturing reasons. If external light reflects off the tapered surface generated on the outer edge of the electrode portion, a pattern of the electrode portion may be seen by a user, and display quality of images displayed on the display device may be deteriorated.

DISCLOSURE OF THE PRESENT INVENTION

The technology disclosed herein was made in view of the above circumstances. An object is to provide a technology that a pattern of an electrode portion is less likely to be seen.

Means for Solving the Problem

A position input device according to the present technology includes a trace group including traces arranged at an interval, the traces being made of a light transmissive conductive film, and an electrode portion made of the light transmissive conductive film, arranged adjacent to the trace group, and including a slit extending along the traces.

The traces and the electrode portion that are made of the light transmissive conductive film include the outer edges and the outer edges may have tapered surfaces generated during manufacturing. External light may reflect off the tapered surfaces, and the reflected light reflecting off the tapered surfaces of the outer edges of the electrode portion may be recognized as the pattern of the electrode portion. The electrode portion includes the slits and the outer edges around the slits of the electrode portion may have tapered surfaces similarly to the outer edges. Therefore, external light reflects off the tapered surfaces of the outer edges of the electrode portion, and the external light also reflects off the tapered surfaces of the outer edges around the slits. Accordingly, the light reflecting off the tapered surfaces of the outer edges of the electrode portion is less likely to be seen. The slits included in the electrode portion extend along the traces. Light reflects off the tapered surfaces of the outer edges of the traces included in the trace group. Light also reflects off the tapered surfaces of the outer edges of the electrode portion, the tapered surfaces following the traces. Light also reflects off the tapered surfaces of the edges of the slits included in the electrode portion. Such three types of reflected light are seen with a similar level and are less likely to be recognized as a specific pattern. Accordingly, the pattern of the electrode portion is less likely to be seen by a user of the position input device.

The position input device of the present technology may include following configurations.

(1) The electrode portion may include slits that are arranged at an interval and separated from each other. According to such a configuration, compared to a configuration in which the slits are communicated with each other, a disconnected portion is less likely to be generated in the electrode portion. Therefore, electric resistance is maintained to be low in the electrode portion.

(2) The slit included in the electrode portion may have a width that is equal to the interval between the traces that are included in the trace group and are adjacent to each other. Light reflects off the tapered surfaces of the edges of the slits included in the electrode portion. Light also reflects off the tapered surfaces of the outer edges of the traces included in the trace group and disposed at the interval that is same as the width of the slit. According to the configuration, such two types of reflected light are seen with a similar level and are less likely to be recognized as a specific pattern. Accordingly, the pattern of the electrode portion is less likely to be seen.

(3) The electrode portion may include slits that are arranged at an interval and the interval between adjacent slits may be equal to a line width of the traces included in the trace group. Light reflects off the tapered surfaces of the edges of the slits included in the electrode portion. Light also reflects off the tapered surfaces of the outer edges of one of the traces included in the trace group, the one trace having the line width that is equal to the interval between the adjacent slits. According to the above configuration, such two types of reflected light are seen with a similar level and are less likely to be recognized as a specific pattern. Accordingly, the pattern of the electrode portion is less likely to be seen.

(4) The trace group may include the traces having different line widths, and the interval between the adjacent slits included in the electrode portion may be equal to a greatest one of the different line widths. Light reflects off the tapered surfaces of the edges of the slits included in the electrode portion. Light also reflects off the tapered surfaces of the outer edges of the trace having the greatest line width among the traces included in the trace group. According to the above configuration, such two types of reflected light are seen with a similar level and are less likely to be recognized as a specific pattern.

(5) The trace group may include the traces having different line widths, and the interval between the adjacent slits included in the electrode portion may be between a smallest one of the different line widths and a greatest one of the different line widths. Light reflects off the tapered surfaces of the edges of the slits included in the electrode portion. Light also reflects off the tapered surfaces of the outer edges of the trace having the greatest line width among the traces included in the trace group. According to the above configuration, such two types of reflected light are seen with a similar level and are less likely to be recognized as a specific pattern.

(6) Each of the traces included in the trace group may have a planar shape extending with being bent in a zigzag shape, and the slit included in the electrode portion may have a planar shape having bending portions. With such a configuration, in the position input device used in combination with another display device, moire is less likely to occur. Further, the traces include the slits having the bending portions following the shape of traces. Light reflecting off the tapered surfaces of the outer edges of the traces, and light also reflects off the tapered surfaces of the edges around the slits included in the electrode portion. According to the above configuration, such two types of reflected light are seen with a similar level and are less likely to be recognized as a specific pattern. Accordingly, the pattern of the electrode portion is less likely to be seen.

(7) The electrode portion may include a driving electrode and a detection electrode, the driving electrode may be connected to any of the traces included in the trace group and generate an electric field, and the detection electrode may be arranged adjacent to the driving electrode and detect the electric field from the driving electrode, and the driving electrode and the detection electrode may include the slits. According to such a configuration, the driving electrode included in the electrode portion is connected to any one of the traces included in the trace group and generate the electric field. The electric field generated by the driving electrodes is detected by the detection electrodes included in the electrode portion. If a user of the position input device puts his/her finger closer to the electrode portion for inputting a position, a part of the electric field generated by the driving electrodes is absorbed by the finger. As a result, the intensity of the electric field detected by the detection electrode is changed and the input position is obtained based on the change in the electric field. The detection electrodes and the driving electrodes included in the electrode portion include the slits, respectively, and the pattern of the detection electrodes and the pattern of the driving electrodes are less likely to be seen by a user.

(8) The driving electrode may include driving electrodes and the detection electrode may include detection electrodes, and the driving electrodes and the detection electrodes may be arranged along the traces, and the electrode portion may further include a dummy electrode made of the light transmissive conductive film and arranged between the trace group and one of the driving electrodes and the detection electrodes, and the dummy electrode may include the slit. According to such a configuration, the traces included in the trace group are sequentially connected to the respective driving electrodes arranged along the traces. Therefore, the number of the traces included in the trace group is gradually decreased from the basal end side toward the distal end side in the extending direction of the trace. The dummy electrodes made of the light transmissive conductive film are arranged between the trace group and the driving electrodes. Therefore, if the number of the traces included in the trace group is decreased at the distal end side of the traces, an empty space generated as a result of the decrease of the number of the traces is filled with the dummy electrodes. Accordingly, unevenness in transmitted light is less likely to occur. The dummy electrodes also include the slits similar to the driving electrodes and the detection electrodes so that the pattern of the dummy electrodes is less likely to be seen by a user.

(9) The driving electrode may be disposed adjacent to the trace group with respect to an arrangement direction in which the traces are arranged, and the detection electrode may be disposed adjacent to the driving electrode with respect to the arrangement direction and on an opposite side from the trace group, and the driving electrode and the detection electrode may have outer edges and a part of the outer edges may be along an outer edge of the traces, and the slits included in the driving electrode and the detection electrode may be along the outer edge of the traces. Light reflects off the tapered surfaces of the outer edges of the driving electrodes and the detection electrodes along the outer edges of the traces. Light also reflects off the tapered surfaces of the outer edges of the traces included in the trace group. Light also reflects the tapered surfaces of the edges of the slits included in the driving electrodes and the detection electrodes. According to the above configuration, such three types of reflected light are seen with a similar level and are less likely to be recognized as a specific pattern. Accordingly, the pattern of the driving electrodes and the detection electrodes is less likely to be seen by a user of the position input device.

(10) Each of the driving electrode and the detection electrode may have a diamond planar shape and have outer edges, and the driving electrode and the detection electrode may be adjacent to each other such that the outer edges thereof are parallel to each other, and the trace group may be disposed between the driving electrode and the detection electrode, and the traces may have a planar shape extending with being bent in a zigzag shape along the outer edges of the driving electrode and the detection electrode, and the slits included in the driving electrode and the detection electrode may have bending portions. External light reflects off the tapered surfaces of the outer edges of the driving electrodes and the detection electrodes each having a diamond plan view shape, and the external light also reflects off the tapered surfaces of the outer edges of the traces having a plan view shape extending with being bent in a zigzag shape along the outer edges of the driving electrodes and the detection electrodes. Light also reflects off the tapered surfaces of the edges of the slits included in the driving electrodes and the detection electrodes. Such three types of reflected light are seen with a similar level and are less likely to be recognized as a specific pattern. Accordingly, the pattern of the driving electrodes and the detection electrodes is less likely to be seen by a user of the position input device.

Next, to solve the above problems, a display device according to the present technology may include the above position input device, and a display panel arranged opposite the position input device and on an inner side with respect to the position input device.

According to such a display device, an input position on an image displayed on the display panel input by a user is detected by the position input device. The position input device is arranged on an outer side with respect to the display panel. With such a configuration, if external light reflects off the tapered surfaces of the outer edges of the electrode portion, the reflected light is likely to be seen directly by a user of the display device. However, with the electrode portion having the slits, the pattern of the electrode portion is less likely to be seen by a user and display quality is improved.

Advantageous Effect of the Invention

According to the technology disclosed in this specification, a pattern of an electrode portion is less likely to be seen.

MODE FOR CARRYING OUT THE INVENTION

First Embodiment

A first embodiment will be described with reference to FIGS. 1 to 12. X-axis, Y-axis and Z-axis may be indicated in some of the drawings. The axes in each drawing correspond to the respective axes in other drawings.

Figure 1:
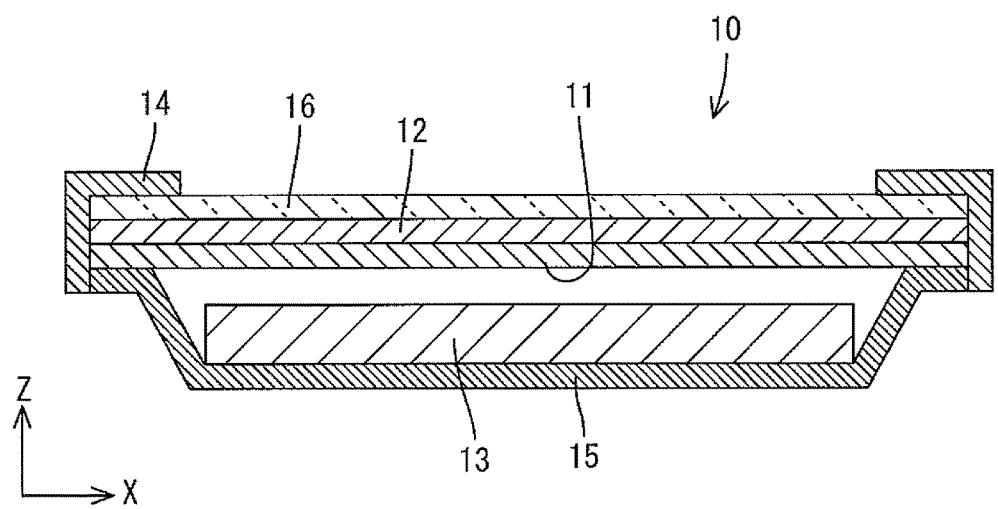
FIG. 1 is a cross-sectional view illustrating a general configuration of a liquid crystal display device according to a first embodiment.
Figure 2:
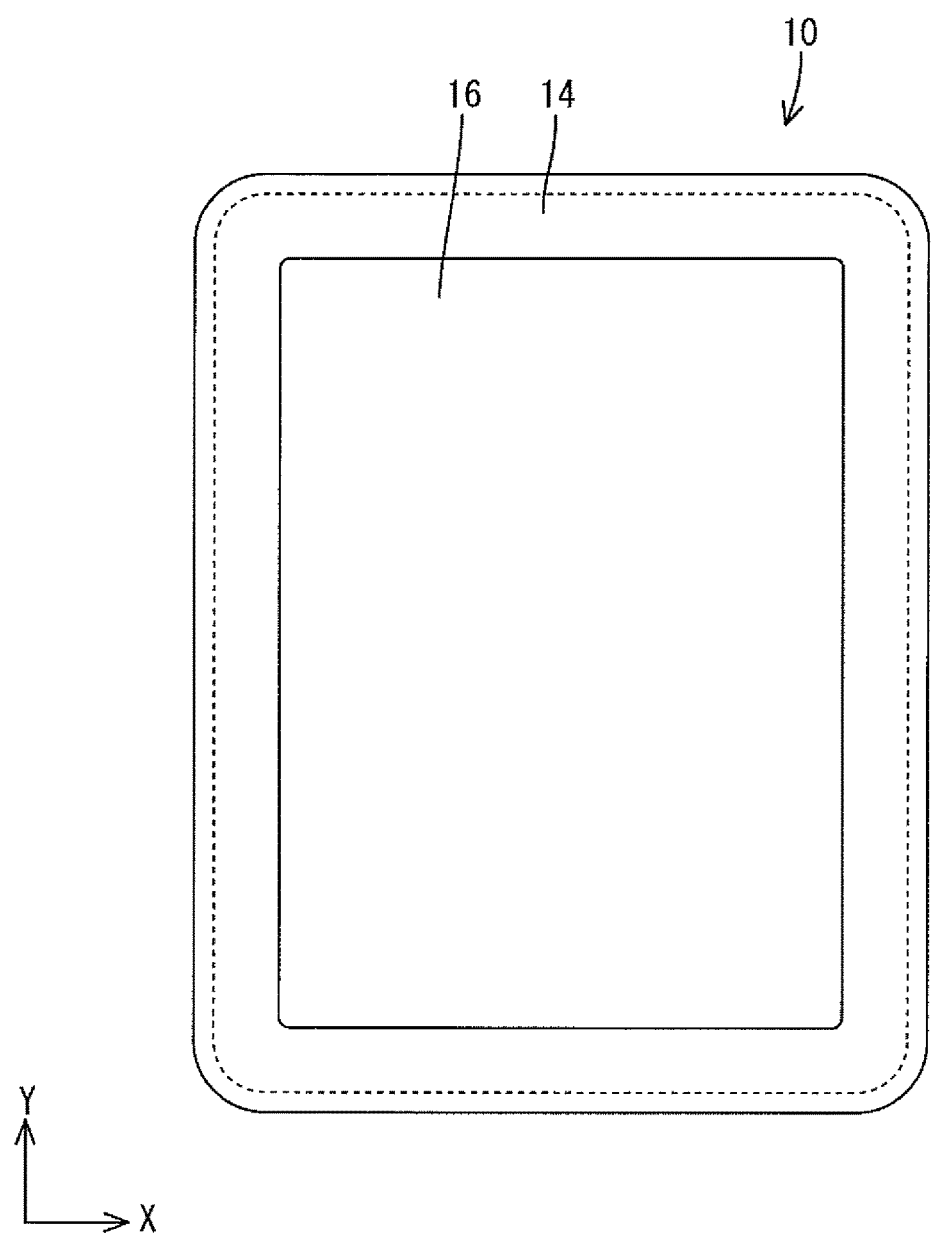
FIG. 2 is a plan view of the liquid crystal display device.

A configuration of a liquid crystal display device 10 will be described. As illustrated in FIGS. 1 and 2, the liquid crystal display device 10 has a rectangular and vertically long overall shape. The liquid crystal display device 10 includes a liquid crystal panel (a display panel) 11 for displaying images thereon, a touch panel (a position input device) opposite the liquid crystal panel 11 and on an outer side (a front side) with respect to the liquid crystal panel 11, and a backlight device (an example of a lighting device) 13 as an external light source for providing light toward the liquid crystal panel 11 and the touch pane 12. The liquid crystal display device 10 further includes a cover panel (a protection panel) 16 for protecting the touch panel 12. The cover panel 16 is disposed opposite the touch panel 12 and on an outer side with respect to the touch panel 12. The cover panel 16 is made of a material having excellent shock resistance properties such as tempered glass. The liquid crystal panel 11, the touch panel 12, and the cover panel 16 are layered to be opposite each other and fixed to each other with having substantially transparent adhesive (not illustrated) therebetween and provided as a unitary part. The liquid crystal display device 10 further includes a cover panel 16, a bezel 14, and a casing 15. The bezel 14 and the backlight device 13 collectively hold the liquid crystal panel 11 and the touch panel 12 therebetween. The bezel 14 is mounted on the casing 15 and the backlight device 13 is arranged in the casing 15.

The liquid crystal display device 10 according to this embodiment is used in electronic devices (not illustrated) such as mobile phones (including smart phones), laptop computers (including tablet-type laptop computers), mobile information terminals (including electronic book and PDA), a digital photo frame, and portable video game players. The display size of the liquid crystal panel 11 included in the liquid crystal display device 10 is from several inches to a dozen inches. Namely, the liquid crystal panel 11 is generally classified as a small sized or a medium sized panel.

Figure 3:
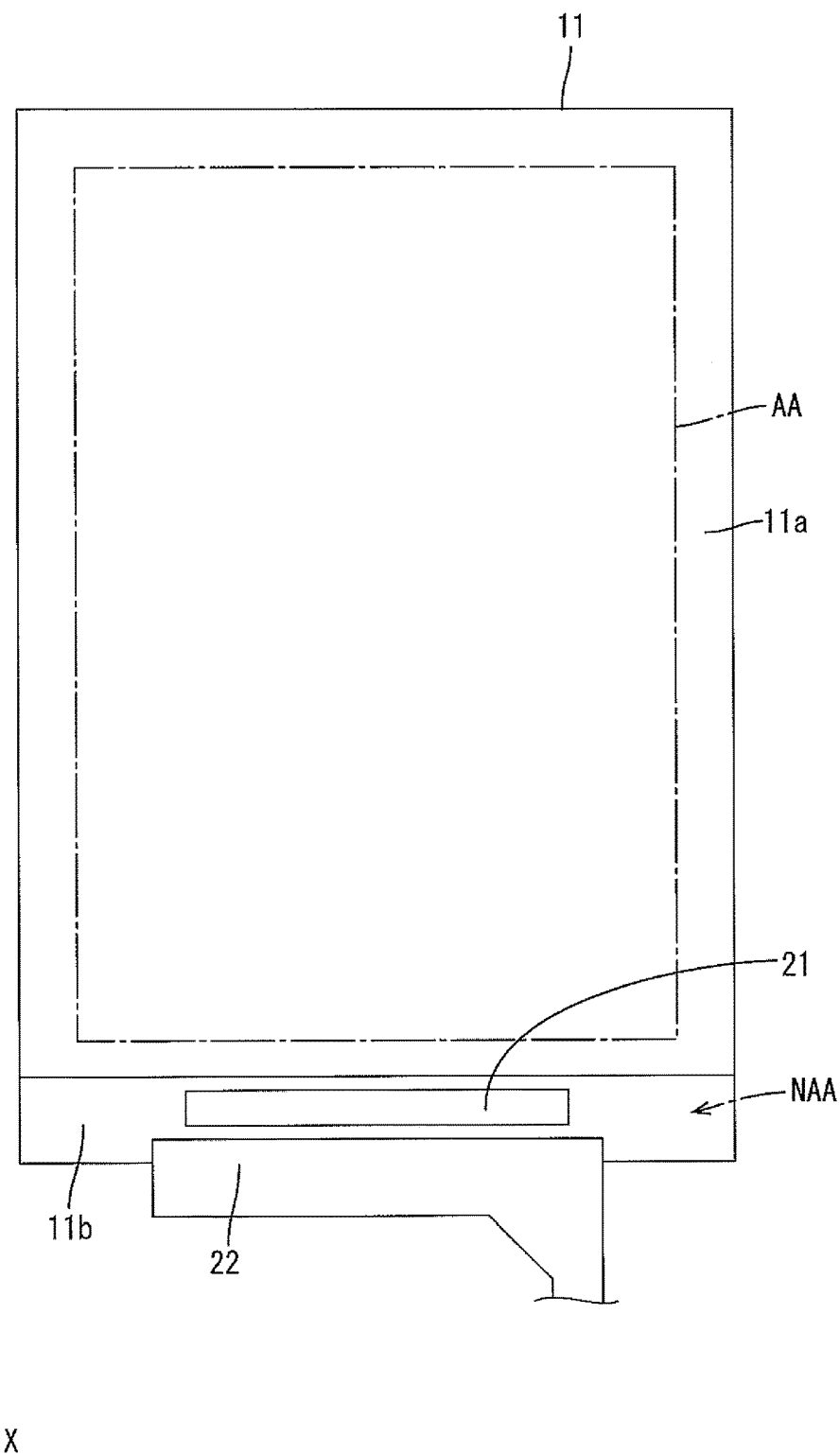
FIG. 3 is a plan view of a liquid crystal panel.

The liquid crystal panel 11 will be described. As illustrated in FIG. 3, the liquid crystal panel 11 has a rectangular and vertically long overall shape. The liquid crystal panel 11 includes a display area (an active area) AA closer to one edge portion in a long-side dimension (an upper side in FIG. 3) and includes a driver 21 and a display flexible board 22 closer to another edge portion in the long-side dimension (a lower side in FIG. 3). Images appear on the display area AA. The liquid crystal panel 11 further includes a non-display area (a non-active area) NAA outside the display area AA. No images appear on the non-display area NAA and a part of the non-display area NAA is a mount area where the driver 21 and the display flexible board 22 are mounted. A short-side direction of the liquid crystal panel 11 corresponds with the X-axis direction in each drawing and a long-side direction corresponds with the Y-axis direction. In FIG. 3, a frame-shaped alternate long and short dashed line that is smaller than the size of a CF board 11a represents an outer shape of the display area AA and an area outside the alternate long and short dashed line is non-display area NAA. The display flexible board 22 is configured to transfer input signals to the liquid crystal panel 11 side and includes a flexible film substrate and traces mounted on the film substrate. The input signals are supplied from a signal supply source (such as a control circuit board), which is not illustrated. The driver 21 is an LSI chip having a driving circuit therein. The driver 21 processes input signals transferred via the display flexile board 22 and generates output signals and outputs the output signals to the display area AA of the liquid crystal panel 11.

Figure 4:
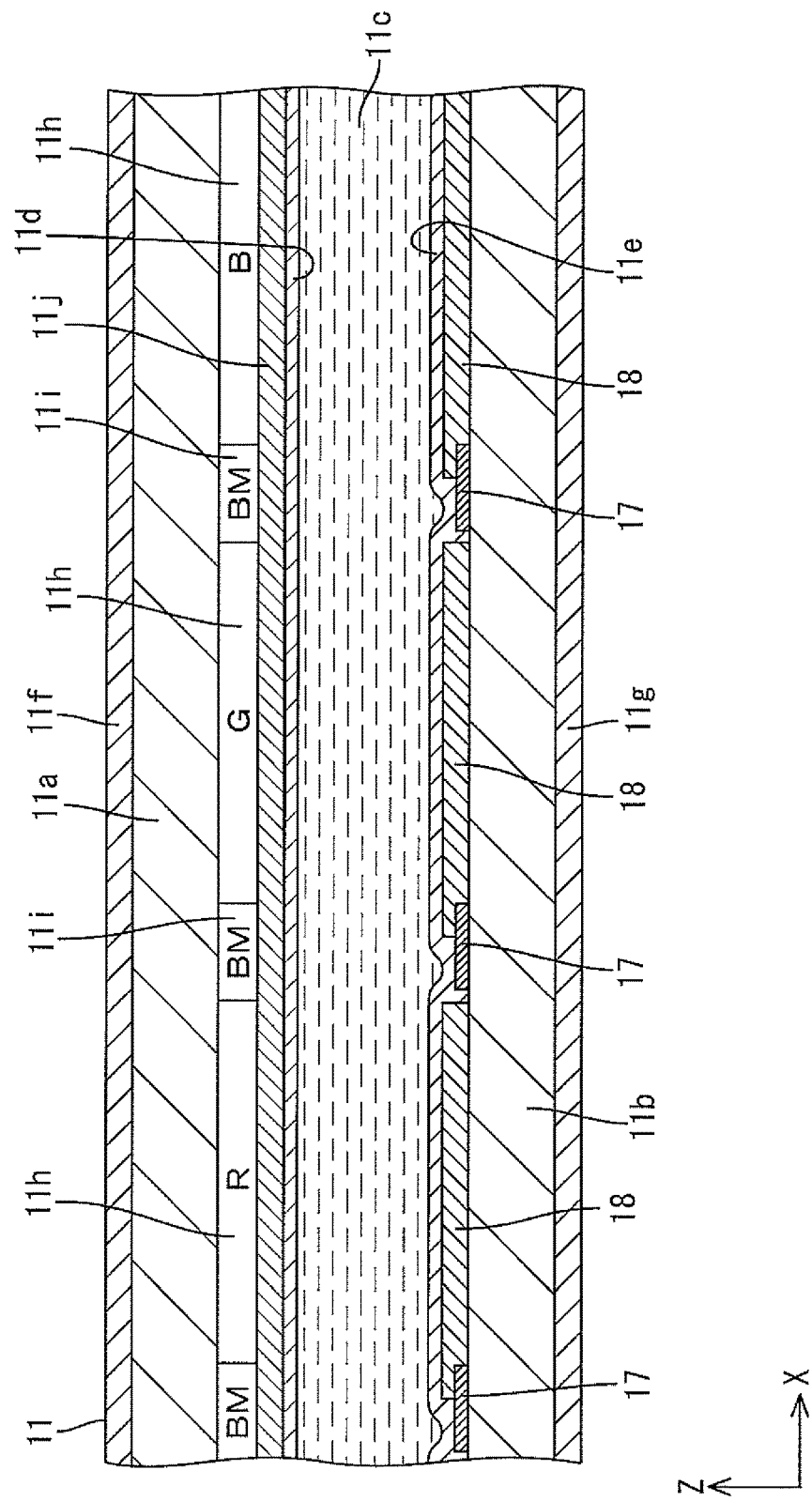
FIG. 4 is a cross-sectional view illustrating a general cross-sectional configuration of the liquid crystal panel.

As illustrated in FIG. 4, the liquid crystal panel 11 includes a pair of transparent glass substrates 11a, 11b (having light transmissivity) and a liquid crystal layer 11c in between the substrates 11a and 11b. The liquid crystal layer 11c contains liquid crystal molecules, which are substances that change optical characteristics when electromagnetic field is applied. The substrates 11a, 11b are bonded together with a sealing agent (not illustrated) with a gap therebetween. The gap corresponds to a thickness of the liquid crystal layer 11c. Each of the substrates 11a, 11b is a substantially transparent glass substrate and multiple layers are layered on each glass substrate with a known photolithography method. One of the substrates 11a, 11b on the front (a front-surface side) is a CF substrate (a counter substrate) 11a and the other one of the substrates 11a, 11b on the rear (a rear-surface side) is an array board (an element board, an active matrix board) 11b. As illustrated in FIG. 3, a short dimension of the CF board 11a is substantially the same as that of the array board 11b and a long dimension of the CF board 11a is substantially smaller than that of the array board 11b. The CF board 11a is bonded to the array board 11b with one of edges of the short dimension of the CF board 11a (the upper edge in FIG. 3) aligned with one of edges of the array board 11b. Therefore, a portion of the array board 11b closer to the other one of the edges thereof (the lower edge in FIG. 3) does not overlap the CF board 11a, that is, front and back surfaces of the portion are uncovered. The mounting section for the drivers 12 and the display flexible board 22 is allocated in this portion. Alignment films 11d, 11e are formed on inner surfaces of the substrates 11a, 11b, respectively, for aligning liquid crystal molecules in the liquid crystal layer 11c. Polarizing plates 11f, 11g are bonded to outer surfaces of the substrates 11a, 11b, respectively.

Figure 5:
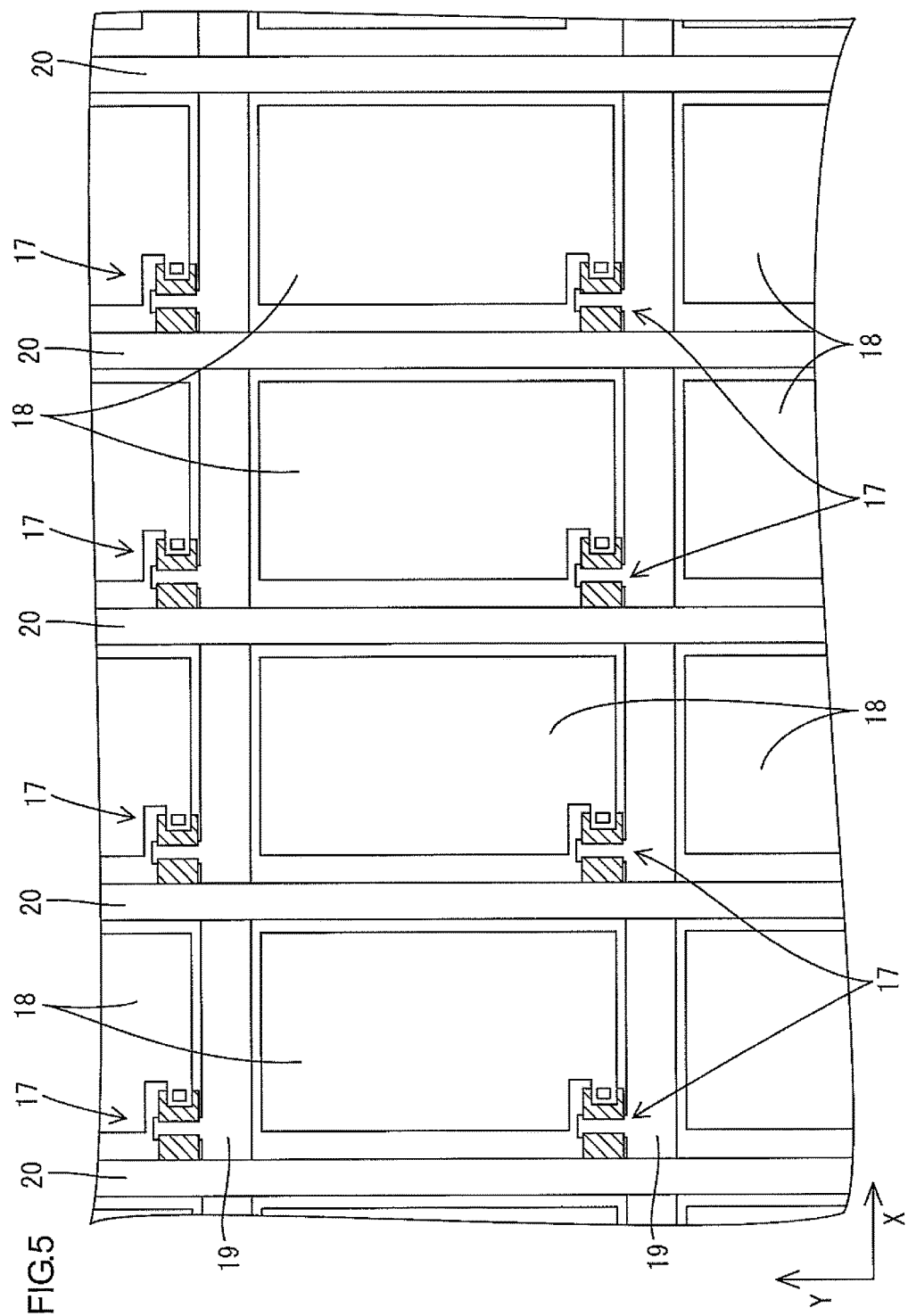
FIG. 5 is a plan view illustrating a planar configuration of a part of a display portion of an array substrate included in the liquid crystal panel.

Next, configurations of the array board 11b and the CF board 11a inside of the display area AA will be described in detail. As illustrated in FIGS. 4 and 5, a large number of thin film transistors (TFTs) 17 and a large number of pixel electrodes 18 are arranged in a matrix on the inner surface of the array board 11b (a surface facing the liquid crystal layer 11c and the CF board 11a). The TFTs 17 are switching components. Gate lines 19 and source lines 20 are arranged in a matrix around the TFTs 17 and the pixel electrodes 18. Namely, the TFTs 17 and the pixel electrodes 18 are arranged in rows and columns in a crossing area defined by the gate lines 19 and the source lines 20 crossing each other. The gate lines 19 and the source lines 20 are connected to gate electrodes and source electrodes of the TFTs 17, respectively. The pixel electrodes 18 are connected to drain electrodes of the TFTs 17. The pixel electrode 18 has a portrait shape (a rectangular shape) in a plan view. The pixel electrode 18 is made of transparent conductive film including transparent and conductive materials such as indium tin oxide (ITO) or zinc oxide (ZnO). Capacitance lines (not illustrated) may be arranged on the array board 11b, parallel to the gate lines 19 and crossing the pixel electrodes 18.

Figure 6:
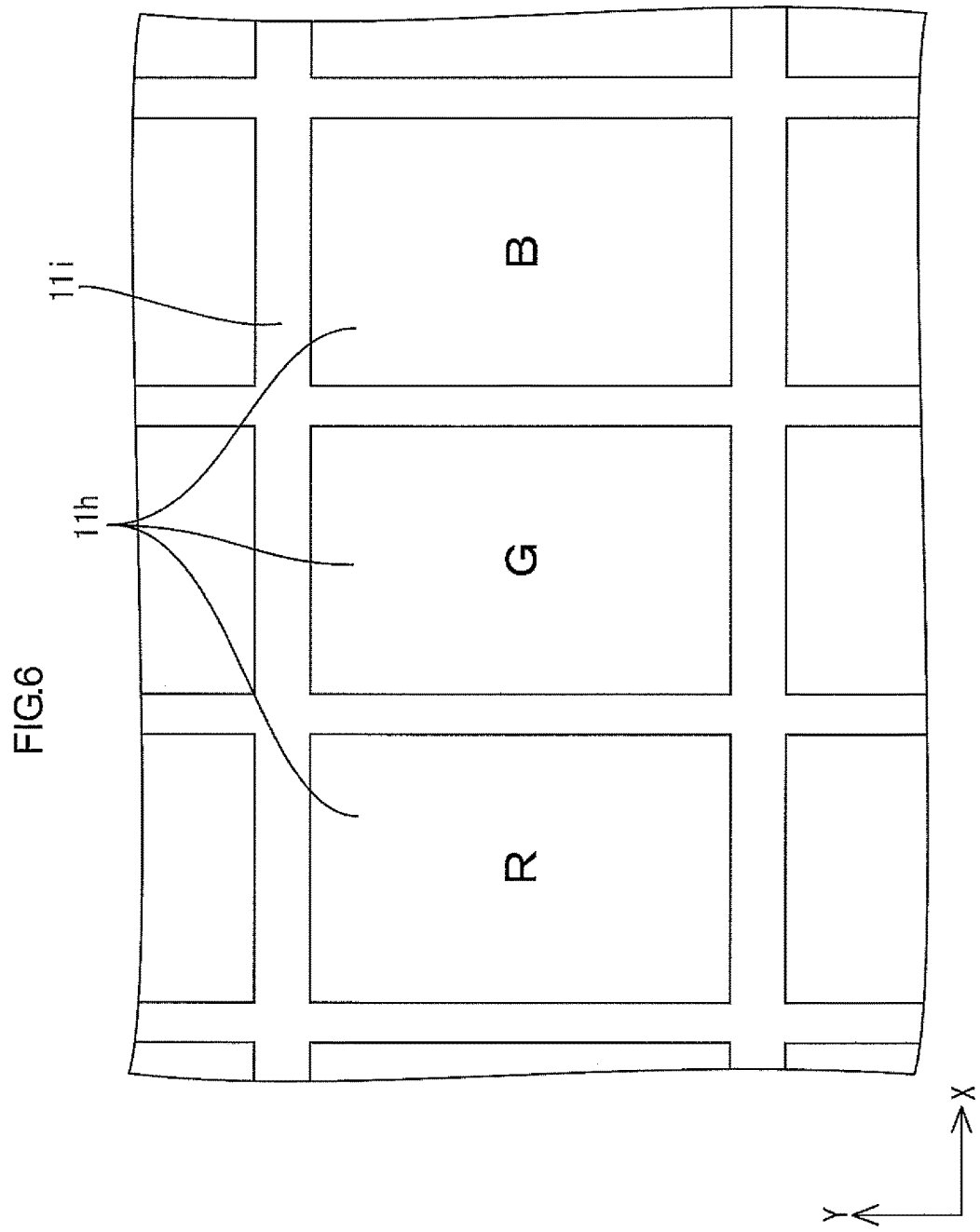
FIG. 6 is a plan view illustrating a planar configuration of a part of a display portion of a CF substrate included in the liquid crystal panel.

As illustrated in FIGS. 4 and 6, the CF board 11a includes a color filter 11h. The color filter 11h includes a large number of color sections colored in red (R), green (G), and blue (B). The color sections are arranged in a matrix and overlap the pixel electrodes 18 disposed on the array board 11b in a plan view. A light blocking layer (a black matrix) 11i is arranged between the color sections of the color filter 11h. The light blocking layer 11i has a function for reducing color mixing. The light blocking layer 11i is disposed corresponding to the gate lines 19 and the source lines 20 in a plan view. Counter electrodes 11j are arranged on surfaces of the color filter 11h and the light blocking layer 11i. The counter electrodes 11j are opposite the pixel electrodes 18 on the array board 11b side. As illustrated in FIGS. 4 to 6, in the liquid crystal panel 11, color sections of three colors including red (R), green (G), and blue (B) and three pixel electrodes 18 opposite the respective three color sections configure one display pixel that is a display unit. The display pixel includes a red pixel having a red R color section, a green pixel having a green G color section, and a blue pixel having a blue B color section. The color pixels of three colors are arranged on a plate surface of the liquid crystal panel 11 in a row direction (the X-axis direction) sequentially in a repeated manner and configure a pixel group. Multiple pixel groups are arranged in the column direction (the Y-axis direction).

Figure 7:
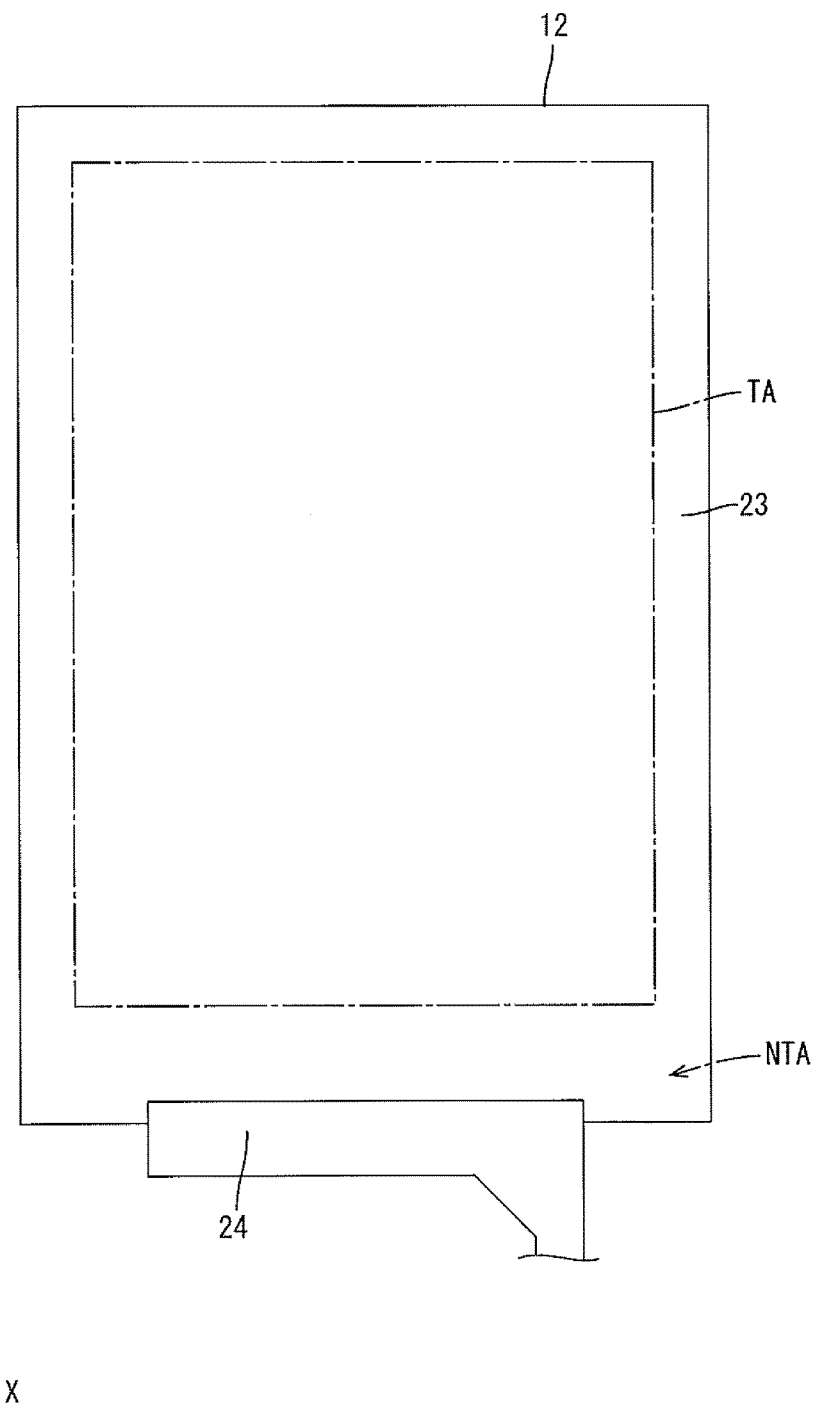
FIG. 7 is a plan view of a touch panel.

Next, the touch panel 12 will be described in detail. A user of the liquid crystal display device 10 inputs position information corresponding to a display image on the liquid crystal panel 11 via the touch panel 12. As illustrated in FIG. 1, the touch panel 12 is arranged between the liquid crystal panel 11 disposed on an inner side (a rear side) with respect to the touch panel 12 and the cover panel 16 disposed on an outer side (a front side) with respect to the touch panel 12. The touch panel 12 is a projection type capacitance touch panel and is a mutual capacitive detection touch panel. As illustrated in FIG. 7, the touch panel 12 includes a substantially transparent (highly light transmissive) glass base board 23 and a substantially transparent light transmissive conductive film is disposed on the base board 23. The light transmissive conductive film is formed in a predetermined pattern (a touch panel pattern) with patterning. The base board 23 has a plan-view vertical rectangular shape similar to the liquid crystal panel 11, and a long-side direction corresponds with the Y-axis direction in each drawing and a short-side direction corresponds with the X-axis direction in each drawing. The base board 23 includes a touch area TA in a middle portion thereof and a non-touch area NTA surrounding the touch area TA and having a frame shape. The user can operate a touch operation (inputs the position) in the touch area TA. The touch area TA overlaps the display area AA of the liquid crystal panel 11 in a plan view and the non-touch area NTA overlaps the non-display area NAA of the liquid crystal panel 11 in a plan view. In FIG. 7, an outer shape of the touch area TA is illustrated with a dashed-dotted line and an area outside the dashed-dotted line corresponds with the non-touch area NTA. A touch panel flexible board 24 is connected to one edge portion (a lower edge portion in FIG. 7) of the base board 23 with respect to the long-side direction and the one edge portion is a part of the non-touch area of the base board 23. The touch panel flexible board 24 is overlapped with the display flexible board 22 connected to the liquid crystal panel 11 in a plan view. The light transmissive conductive film is mainly disposed in the touch area TA of the baseboard 23 and a part of the light transmissive conductive film is disposed in the non-touch area NTA. The light transmissive conductive film is made of transparent and conductive materials such as indium tin oxide (ITO) or zinc oxide (ZnO) similar to the pixel electrodes 18 of the liquid crystal panel 11. The film is formed on the base board 23 with a vacuum vapor deposition method or a sputtering method and patterned with a photolithography method.

Figure 8:
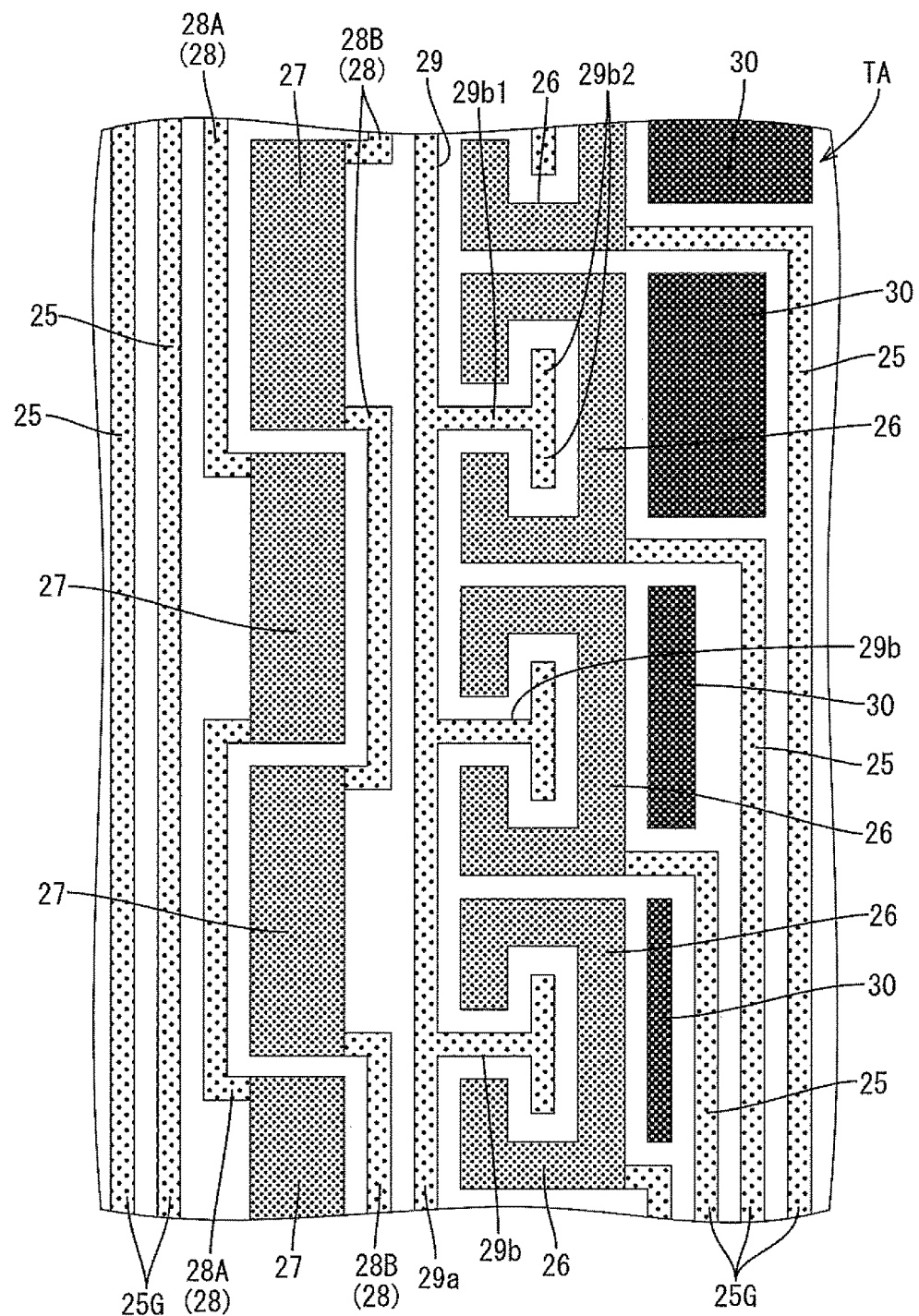
FIG. 8 is a plan view typically illustrating a planar configuration of each trace and each electrode portion on the touch panel.
Figure 9:
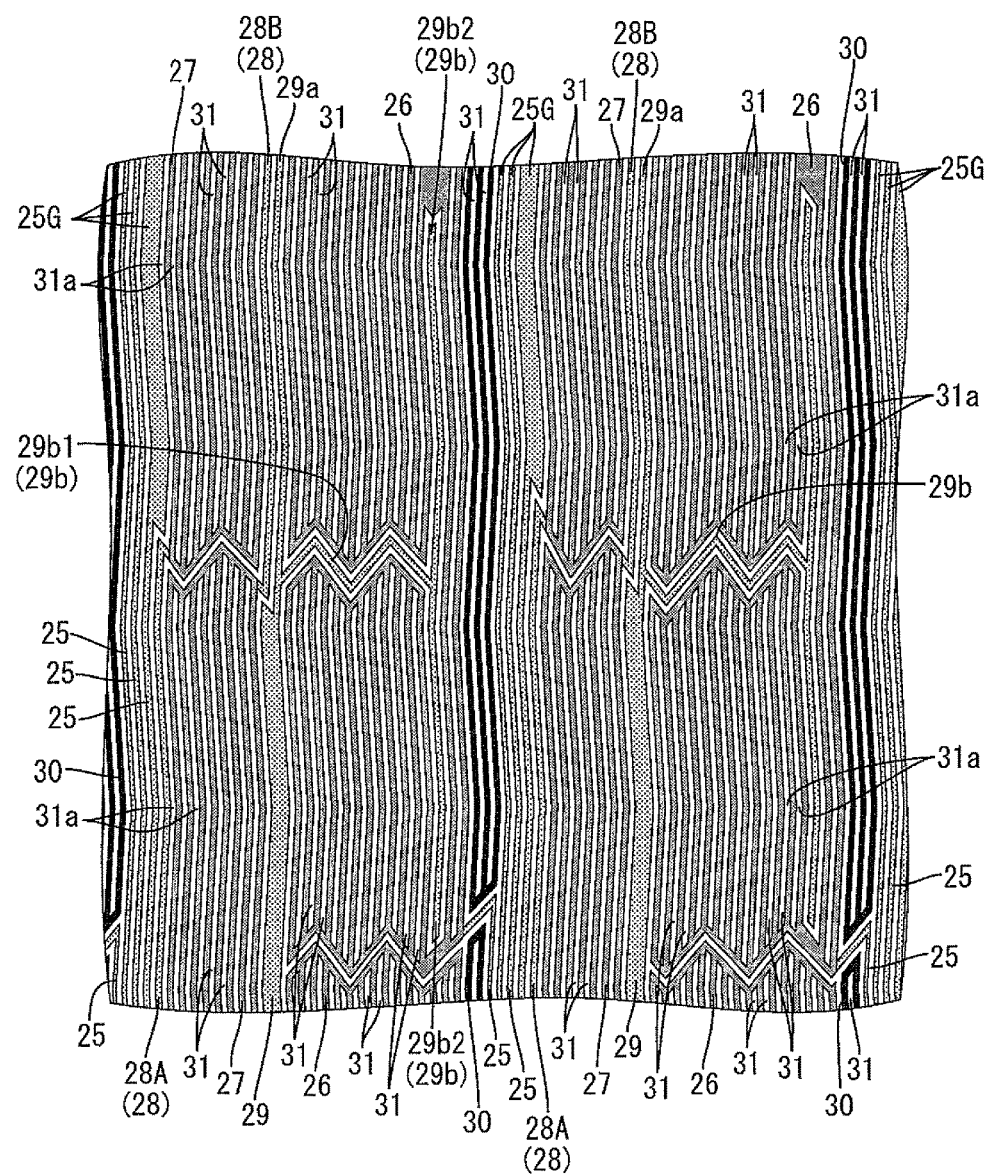
FIG. 9 is a plan view illustrating a planar configuration of each trace portion and each electrode portion in an area from which traces are extended (near a touch panel flexible board).
Figure 10:
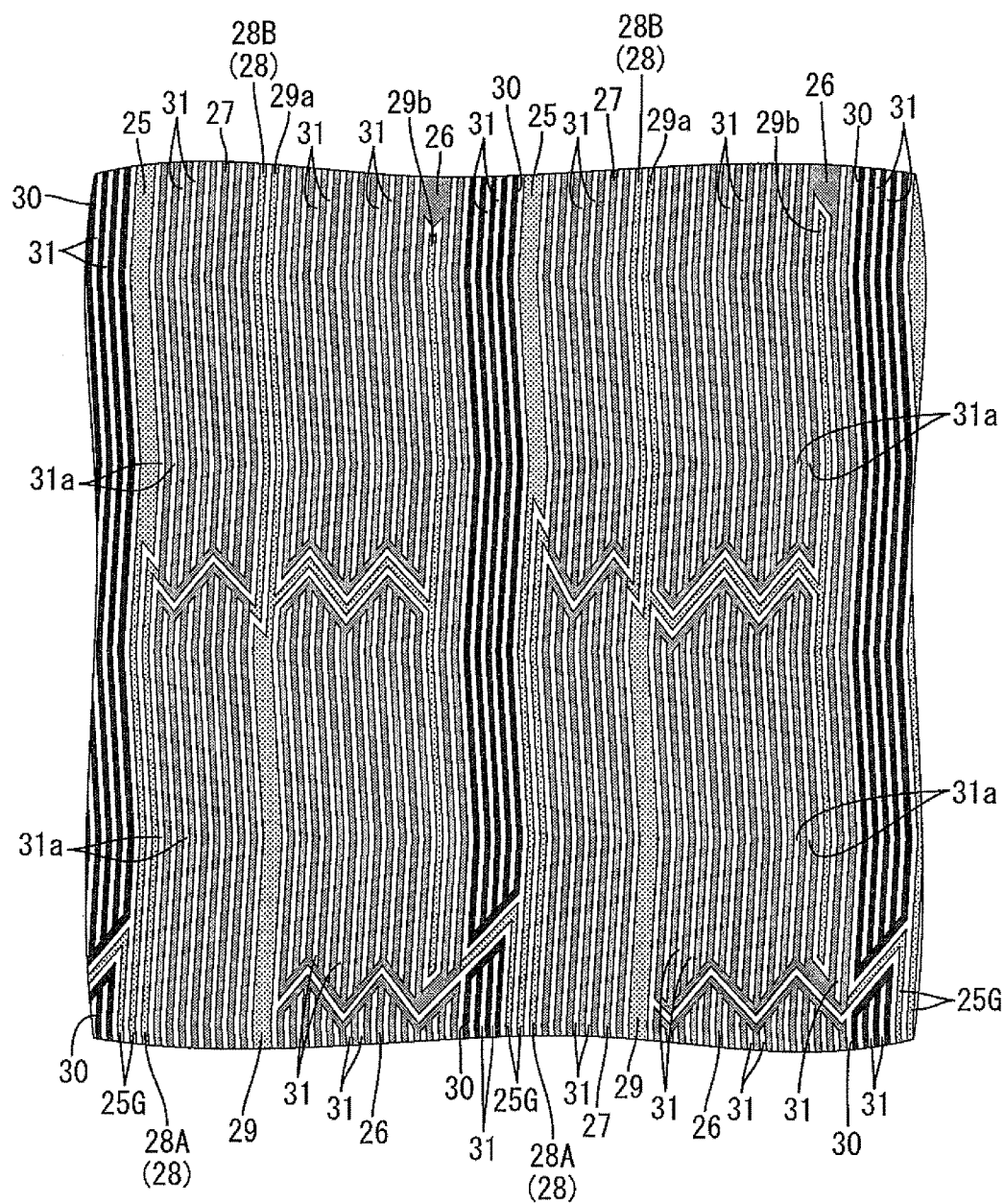
FIG. 10 is a plan view illustrating a planar configuration of each trace and each electrode portion in an area to which traces are extended (away from the touch panel flexible board).

As illustrated in FIG. 8, the light transmissive conductive film forms a trace group 25G including multiple traces 25, driving electrodes (transmission electrodes) 26, detection electrodes (receiving electrodes) 27, short circuit traces 28, a ground trace 29, and dummy electrodes 30. Each of the driving electrodes 26 is connected to each trace 25 and generates an electric filed based on input signals transmitted from the trace 25. The detection electrodes 27 detect the electric field generated by the driving electrodes 26. The short circuit traces 28 short-circuit certain detection electrodes 27. The ground trace 29 is arranged between the driving electrodes 26 and the detection electrodes 27. The dummy electrodes 30 are arranged between the driving electrodes 26 and the trace group 25G. The traces 25, 28, 29 and the electrodes 26, 27, 30 are arranged in the touch area TA of the base board 23 and overlap the display area AA of the liquid crystal panel 11 in a plan view. The traces 25, 28, 29 and the electrodes 26, 27, 30 are made of a substantially transparent and highly light transmissive conductive film and therefore, light from the liquid crystal panel 11 effectively transmits through the traces 25, 28, 29 and the electrodes 26, 27, 30. The driving electrodes 26 and the detection electrodes 27 (sensor electrodes), which are made of the light transmissive conductive film, function as a sensor for detecting input of position information. The driving electrodes 26 and the detection electrodes 27 are arranged adjacent to each other in the X-axis direction so that an electric field generated by the driving electrode 26 is detected by the detection electrode 27 that is adjacent to the driving electrode 26 in the X-axis direction with good sensitivity. The driving electrode 26 and the detection electrode 27 that are adjacent to each other in the X-axis direction configure an electrode unit (a sensor electrode unit). Multiple electrode units are arranged two-dimensionally in the X-axis direction and the Y-axis direction within a plane surface of the touch area TA of the base board 23. According to such a configuration, position information is input in any point within the plane surface of the touch area TA, and a two-dimensional position of the input information is appropriately detected. Hereinafter, the traces 25, 28, 29 and the electrodes 26, 27, 30 that are made of the light transmissive conductive film will be described in detail. FIG. 8 schematically illustrates a planar arrangement of the traces 25, 28, 29 and the electrodes 26, 27, 30 that are made of the light transmissive conductive film and a specific planar shape thereof is illustrated in FIGS. 9 and 10. In FIGS. 8 to 10, an area where the light transmissive conductive film is disposed is illustrated with shading and a pattern of shading is different in the traces 25, 28, 29, the driving electrodes 26 and the detection electrodes 27, and the dummy electrodes 30.

As illustrated in FIG. 8, the traces 25 extends substantially in the Y-axis direction and arranged at intervals in the X-axis direction to form one trace group 25G. In this embodiment, an extending direction in which the traces 25 extend corresponds with the Y-axis direction in each drawing, and an arrangement direction in which the traces 25 are arranged corresponds with the X-axis direction. The input signals transmitted from the touch panel flexible board 24 (see FIG. 7) are transmitted to the driving electrodes 26 via the traces 25. One ends (lower ends in FIG. 8) of the traces 25 are connected to the touch panel flexible board 24 and another ends (upper ends in FIG. 8) thereof are connected to the driving electrodes 26. In this embodiment, the traces 25 have basal end side that is a lower side in FIG. 8 and the touch panel flexible board 24 is arranged on the basal end side. The traces 25 have distal end side that is an upper side in FIG. 8 and the driving electrodes 26 are arranged on the distal end side. Each of the traces 25 included in the trace group 25G is connected to each of the driving electrodes 26 that are arranged in the Y-axis direction and the number of the traces 25 is equal to the number of the driving electrodes 26 arranged in the Y-axis direction. The traces 25 of the trace group 25G include one trace that is close to the driving electrode 26 to be connected (on the left side in FIG. 8) and the one trace 25 is connected to the driving electrode 26 that is on the basal end side (close to the touch panel flexible board 24) with respect to the Y-axis direction. The traces 25 includes another trace 25 that is far away from the driving electrode 26 to be connected (on the right side in FIG. 8) and the other trace 25 is connected to the driving electrode 26 that is on the distal end side (far away from the touch panel flexible board 24) with respect to the Y-axis direction. The trace groups 25G each of which includes the traces 25 are arranged in the X-axis direction at predetermined intervals. The electrode unit including the driving electrodes 26 and the detection electrodes 27 that are adjacent to each other in the X-axis direction is arranged between the trace groups 25G that are arranged in the X-axis direction. The number of the trace groups 25G arranged in the X-axis direction is equal to the number of the electrode units that are arranged in the X-axis direction. The electrode units include the driving electrodes 26 and the detection electrodes 27. Namely, the trace group 25G defines each of the electrode units arranged in the X-axis direction.

Figure 11:
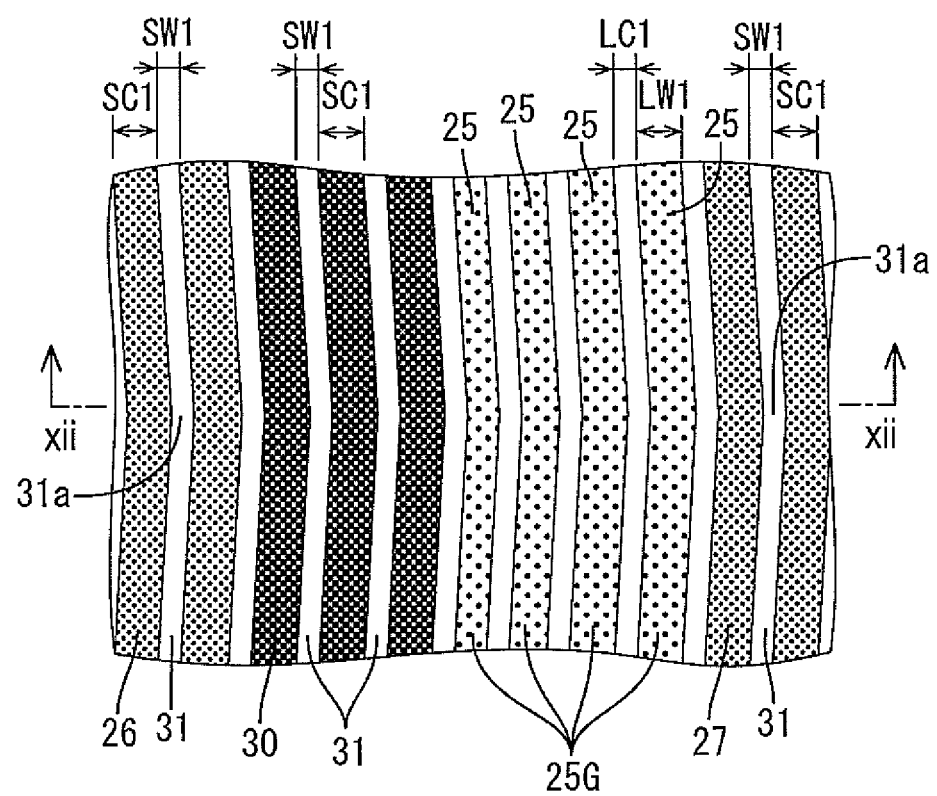
FIG. 11 is an enlarged plan view illustrating a planar configuration of traces, a driving electrode, and a detection electrode on the touch panel.

As illustrated in FIG. 9, the traces 25 included in the trace group 25G have a planar shape extending with being bent repeatedly in a zigzag shape. A bending angle of bending portions of the traces is quite small with respect to a straight line (a gentle angle). Further, the traces 25 included in the trace group 25G have different widths according to the position thereof with respect to the X-axis direction. Specifically, as illustrated in FIGS. 9 and 11, the traces 25 included in the trace group 25G have smaller width as is closer to the driving electrode 26 to be connected (one that is closest to the driving electrode 26 is the left-most one in FIGS. 9 and 11). The traces 25 have greater width as is farther away from the driving electrode 26 to be connected (one that is farthest from the driving electrode 26 is the right-most one in FIGS. 9 and 11). Namely, the traces 25 included in the trace group 25G have widths that are continuously and gradually decreased as is closer to the driving electrode 26 to be connected in the X-axis direction or in the arrangement direction of the traces 25. The traces 25 have widths that are continuously and gradually increased as is farther away from the driving electrode 26 to be connected in the X-axis direction. According to such a configuration, as illustrated in FIG. 9, the trace 25 connected to the driving electrode 26 that is close to the touch panel flexible board 24 with respect to the Y-axis direction has a short length (extension distance) and a wide width. As illustrated in FIG. 10, the trace 25 connected to the driving electrode 26 that is far from the touch panel flexible board 24 with respect to the Y-axis direction has a great length and a small width. Accordingly, trace resistances of the traces 25 are uniform and input signals input to the driving electrodes 26 have uniform quality. The traces 25 included in the trace group 25G are arranged at a substantially equal interval LC1 as illustrated in FIG. 11.

As illustrated in FIG. 8, the driving electrode 26 has a vertically elongated rectangular plan view shape and the driving electrodes 26 are arranged in the X-axis direction and the Y-axis direction. The driving electrodes 26 arranged in the Y-axis direction are physically separated from each other and adjacent to each other directly. The trace group 25G and the detection electrodes 27 are arranged between the driving electrodes 26 arranged in the X-axis direction. The driving electrodes 26 are arranged on the left side in FIG. 8 with respect to the trace group 25G including the traces 25 connected to the driving electrodes 26 and arranged on the right side in FIG. 8 with respect to the detection electrodes 27 that detect the electric field generated by the driving electrodes 26 (that configure the electrode units with the detection electrodes). Namely, the driving electrodes 26 are arranged between the trace group 25G including the traces 25 to be connected to the driving electrodes 26 and the detection electrodes 27 detecting the electric field generated by the driving electrodes 26. The driving electrode 26 that is on a lowest side in FIG. 8 is connected to a closest one of the traces 25 included in the trace group 25G. The closest one of the traces 25 (the left-most one in FIG. 8) is closest to the driving electrode 26 that is on the lowest side in FIG. 8. Each of the traces 25 included in the trace group 25G is connected independently to each of the driving electrodes 26 that are arranged in the Y-axis direction and input signals are input via the traces 25 with sequentially scanning the driving electrodes 26. More in detail, as illustrated in FIG. 9, the driving electrodes 26 have outer edges along the Y-axis direction (the extending direction of the traces 25) and the outer edges have a planar shape bent repeatedly in a zigzag shape following the shape of the traces 25. The outer edges of the driving electrodes 26 along the Y-axis direction have bending portions having a bending angle that is substantially equal to the bending angle of the bending portion of the outer edges of the traces 25 that are along the Y-axis direction. The driving electrodes 26 have an outer edge along the X-axis direction (the arrangement direction of the traces 25) and the outer edge along the X-axis direction has a planar shape bent repeatedly in a zigzag shape. The outer edge of the driving electrodes 26 along the X-axis direction has bending portions having a bending angle that is greater with respect to a straight line (a steep angle) compared to the bending angle of bending portions of the outer edges along the Y-axis direction.

As illustrated in FIG. 8, the detection electrode 27 has a vertically elongated rectangular plan view shape and the detection electrodes 27 are arranged in the X-axis direction and the Y-axis direction. The detection electrodes 27 arranged in the Y-axis direction are directly adjacent to each other and the trace group 25G and the driving electrodes 26 are arranged between the detection electrodes 27 arranged in the X-axis direction. The detection electrode 27 is arranged on the left side in FIG. 8 with respect to the driving electrode 26 that generates an electric field to be detected by the detection electrode 27 (that configures the electrode unit with the driving electrode 26). The driving electrode 26 that generates the electric field to be detected by the detection electrode 27 is arranged between the detection electrode 27 and the trace group 25G including the trace 25 that is connected to the driving electrode 26 generating the electric field to be detected by the detection electrode 27. The detection electrodes 27 arranged in the Y-axis direction have a long-side dimension (a dimension in the Y-axis direction) substantially same as a long-side dimension of the driving electrodes 26. The detection electrodes 27 arranged in the Y-axis direction are offset with respect to the Y-axis direction from the driving electrodes 26 that are adjacent to the detection electrodes 27 in the X-axis direction. For example, an offset amount is approximately a half of the long-side dimension. Namely, the driving electrodes 26 and the detection electrodes 27 that are adjacent to each other in the X-axis direction are arranged in a zigzag shape. More specifically, as illustrated in FIG. 9, the detection electrodes 27 have outer edges along the Y-axis direction (the extending direction of the traces 25) and the outer edges have a planar shape bent repeatedly in a zigzag shape following the shape of the traces 25. Bending portions of the outer edges (along the Y-axis direction) of the detection electrodes 27 have a bending angle that is substantially same as the bending angle of the bending portions of the outer edges (along the Y-axis direction) of the driving electrodes 26 and the traces 25. The detection electrodes 27 have an outer edge along the X-axis direction (the arrangement direction of the traces 25) and the outer edge has a planar shape bent repeatedly in a zigzag shape. Bending portions of the outer edge have a bending angle that is substantially same as the bending angle of the bending portions included in the outer edge (along the X-axis direction) of the driving electrodes 26.

As illustrated in FIG. 8, the short circuit traces 28 extend in the Y-axis direction following the shape of the traces 25 included in the trace group 25G and are arranged adjacent to the detection electrodes 27 with respect to the X-axis direction. The short circuit traces 28 short-circuit two detection electrodes 27 with skipping the one between the two detection electrodes 27. Namely, the detection electrodes 27 that are adjacent to each other in the X-axis direction are not connected via the short circuit trace 28 and the short circuit traces 28 are connected to the respective two detection electrodes 27 that are adjacent to each other in the Y-axis direction. More in detail, the short circuit traces 28 include first short circuit traces 28A and second short circuit traces 28B. The first short circuit traces 28A are arranged on a trace group 25G side (on the left side in FIG. 8) in the X-axis direction with respect to the detection electrodes 27. The second short circuit traces 28B are arranged on a driving electrode 26 side in the X-axis direction with respect to the detection electrodes 27. The first short circuit traces 28A short-circuit the odd-numbered detection electrodes 27 or the even-numbered detection electrodes 27 from the edge in the Y-axis direction. The second short circuit traces 28B short-circuit the even-numbered detection electrodes 27 or the even-numbered detection electrodes 27 from the edge in the Y-axis direction. The first short-circuit traces 28A and the second short circuit traces 28B are not arranged on a same level with respect to the X-axis direction and arranged alternately in the Y-axis direction. The first short circuit traces 28A and the second short circuit traces 28B are arranged in a zigzag shape in a plan view. An end portion of the short circuit trace 28 is connected to a short circuit trace 28 side long-edge of the detection electrode 27 to be connected. As illustrated in FIG. 9, the short circuit traces 28 have a planar shape that is bent repeatedly in a zigzag shape following the shape of the traces 25. Bending portions have a bending angle that is substantially same as the bending angle of the bending portions of the traces 25. One of the first short circuit trace 28A and the second short circuit trace 28B that is arranged at a touch panel flexible board 24 side edge is connected to the touch panel flexible board 24 and transfers output signals regarding intensity of the electric field generated by the driving electrode 26 to a touch panel controller, which is not illustrated. The touch panel controller inputs the input signals sequentially to the driving electrodes 26, which are arranged in the Y-axis direction, with scanning. The touch panel controller determines a position in the detection electrode 27 where intensity of the electric field is changed according to the output signals output from the detection electrodes 27 arranged in the Y-axis direction. The touch panel controller determines the position in the detection electrode 27 with respect to the X-axis direction and the Y-axis direction and the position is defined as the input position.

As illustrated in FIG. 8, the ground trace 29 is a trance that is grounded and disposed between the driving electrodes 26 and the detection electrodes 27 that are adjacent to each other in the X-axis direction and configure the electrode unit. The driving electrodes 26 and the detection electrodes 27 that configure the electrode unit are electrically separated from each other by the ground trace 29. The ground trace 29 includes a ground trace main part 29a and ground trace branches 29b. The ground trace main part 29a extends in the Y-axis direction following the traces 25 included in the trace group 25G, and the ground trace branches 29b are branched from the ground trace main part 29a. As illustrated in FIG. 9, the ground trace main part 29a has a planar shape bent repeatedly in a zigzag shape following the traces 25 and bending portions have a bending angle that is substantially same as the bending angle of the bending portions of the traces 25. The ground trace branch 29b includes a branch main part 29b1 and a pair of second branch portions 29b2. The branch main part 29b1 extends from the ground trace main part 29a in the X-axis direction toward the driving electrodes 26. The second branch portions 29b2 are branched from an extended end of the branch main part 29b1 and extend in the Y-axis direction. The driving electrode 26 has a recess following an outer shape of the ground trace branch 29b and a space is between the ground trace branch 29b and the driving electrode 26 so that the ground trace branch 29b and the driving electrode 26 are not short-circuited. The branch main part 29b1 is disposed in a middle portion of the driving electrode 26 with respect to the long-side direction thereof (at a border of the adjacent detection electrodes 27 with respect to the Y-axis direction). The branch main part 29b1 has a planar shape bent repeatedly in a zigzag shape following an outer edge of the driving electrode 26 and the detection electrode 27 in the X-axis direction. Bending portions of the branch main part 29b1 have a bending angle that is substantially same as the bending angle of the bending portions of the outer edge of the driving electrodes 26 and the detection electrodes 27 in the X-axis direction.

As illustrated in FIG. 8, the dummy electrode 30 is arranged between the driving electrode 26 and the trace 25 that is adjacent to the trace 25 connected to the driving electrode 26. The dummy electrode has a rectangular shape elongated in the Y-axis direction and having a long-side dimension that is slightly smaller than the long-side dimension of the driving electrode 26. The dummy electrodes 30 are arranged in the Y-axis direction and a part of the trace to be connected to the driving electrode 26 is arranged between the dummy electrodes 30 that are adjacent to each other in the Y-axis direction. As illustrated in FIG. 9, the dummy electrodes 30 have a planar shape bent repeatedly in a zigzag shape following the shape of the traces 25 and bending portions have a bending angle that is substantially same as the bending angle of the bending portions of the traces 25. As illustrated in FIGS. 9 and 10, the dummy electrodes 30 arranged in the Y-axis direction have short side dimensions (dimensions with respect to the X-axis direction) that change according to the position with respect to the Y-axis direction. As is closer to the touch panel flexible board 24 (on a lower side in FIGS. 9 and 10), the short-side dimension of the dummy electrode 30 is smaller, and as is farther from the touch panel flexible board 24 (on an upper side in FIGS. 9 and 10), the short-side dimension of the dummy electrode 30 is greater. The dummy electrodes 30 arranged in the Y-axis direction have different short-side dimensions because of the following reasons. The number of the traces 25 that are not yet connected to the driving electrode 26 is increased as is closer to the touch panel flexible board 24. The number of the traces 25 that are not yet connected to the driving electrode 26 is reduced as is farther away from the touch panel flexible board 24. The driving electrodes 26 that are arranged in the Y-axis direction have a constant short side dimension, and the detection electrodes 27 that are arranged in the Y-axis direction have a constant short side dimension. Accordingly, the number of the traces 25 is decreased and an area occupied by the trace group 25G is decreased in an area far from the touch panel flexible board 24 compared to an area close to the touch panel flexible board 24 in the Y-axis direction. Therefore, a relatively large space is between the driving electrode 26 and the trace group 25G in the area far from the touch panel flexible board 24 compared to the area close to the touch panel flexible board 24. The dummy electrodes 30 are disposed to fill the space and the short side dimension of the dummy electrode 30 is increased as the space is greater as is farther from the touch panel flexible board 24. Accordingly, positional relation between the driving electrodes 26 and the detection electrodes 27 in the X-axis direction is maintained constant regardless of the position in the Y-axis direction. The dummy electrodes 30 are arranged in the spaces between the driving electrodes 26 and the trace group 25G so that the spaces do not correspond to the area where the light transmissive conductive film is not disposed. The light transmissive conductive film has high light transmissive properties. However, the light transmissive conductive film may absorb or reflect a small amount of light. Therefore, the amount of light transmitting through a light transmissive conductive film forming area is slightly different from that transmitting through a non-forming area. The dummy electrodes 30 are disposed in the spaces between the driving electrodes 26 and the trace group 25G and therefore, the spaces do not correspond to the light transmissive conductive film non-forming area and unevenness in brightness is less likely to occur. The dummy electrodes 30 are not connected to other traces or electrodes and are electrically isolated.

In manufacturing the touch panel 12 having the above configuration, the light transmissive conductive film is disposed on the base board 23 with a vacuum vapor deposition method or a sputtering method and photoresist is formed on the light transmissive conductive film. The photoresist on the light transmissive conductive film is exposed with light via a photomask and developed and processed with etching so that the pattern of the photomask is transferred on the light transmissive conductive film. Thus, the pattern of the traces 25, 28, 29 and the pattern of the electrodes 26, 27, 28 are formed on the base board 23. The traces 25, 28, 29 and the electrodes 26, 27, 30 are formed via the processes of the photolithography method and therefore, each of the traces and the electrodes may have a tapered surface TF on an outer edge thereof. If external light reflects off the tapered surfaces, the reflected light may be seen by a user of the liquid crystal display device 10 and the touch panel 12. Among the components made of the light transmissive conductive film, the driving electrodes 26 and the detection electrodes 27 that have relatively large areas may have the tapered surfaces TF on the outer edges thereof. If the external light reflects off the tapered surfaces TF, the pattern of the driving electrodes 26 and the detection electrodes 27 may be seen by the user. In such a case, display quality of images on the liquid display panel 11 may be deteriorated.

Figure 12:
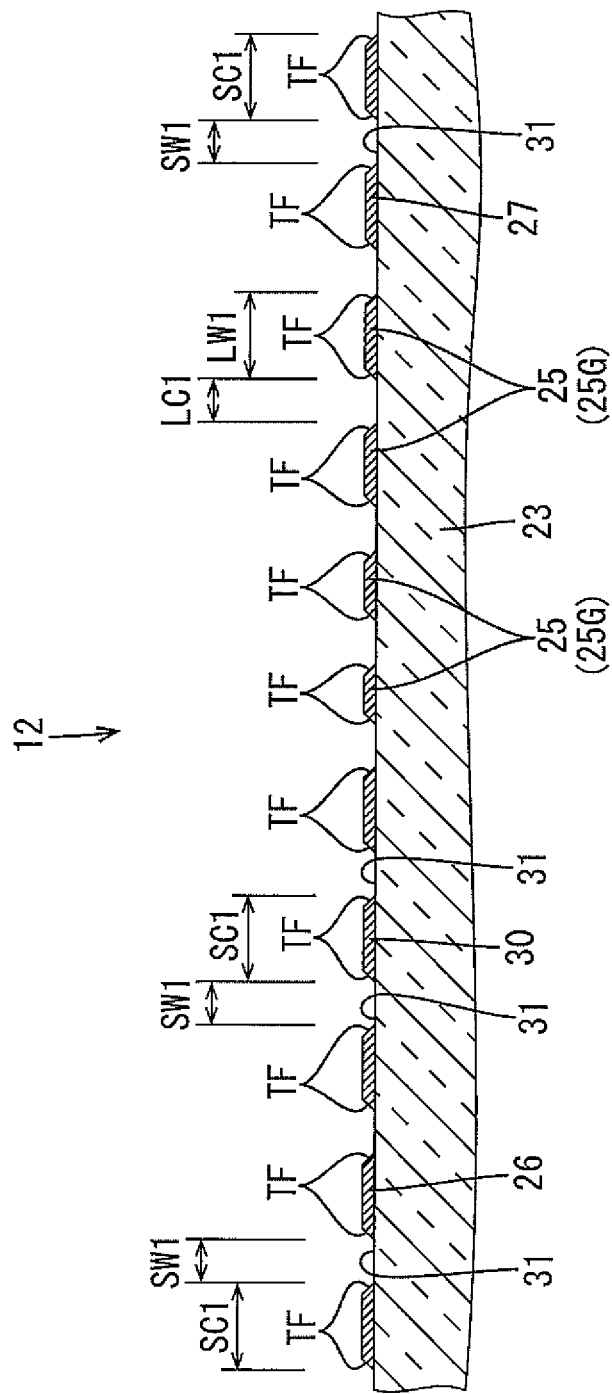
FIG. 12 is a cross-sectional view taken along line xii-xii in FIG. 11.

As illustrated in FIGS. 8 and 10, among the components made of the light transmissive conductive film included in the touch panel 12, at least the driving electrodes 26 and the detection electrodes 27 include slits 31, respectively. The driving electrodes 26 and the detection electrodes 27 include outer edges around the slits 31 as illustrated in FIG. 12 and the outer edges around the slits 31 have tapered surfaces TF generated during manufacturing similarly to the outer edges or the driving electrodes 26 and the detection electrodes 27. Therefore, external light reflects off the tapered surfaces TF of the outer edges of the driving electrodes 26 and the detection electrodes 27, and the external light also reflects off the tapered surfaces TF of the outer edges around the slits 31 included in the driving electrodes 26 and the detection electrodes 27. Accordingly, the light reflecting off the tapered surfaces TF of the outer edges of the driving electrodes 26 and the detection electrodes 27 is less likely to be seen. The slits 31 included in the driving electrodes 26 and the detection electrodes 27 extend along the traces 25 included in the trace group 25G. Light reflects off the tapered surfaces TF of the outer edges of the traces 25 included in the trace group 25G. Light also reflects off the tapered surfaces TF of the outer edges of the driving electrodes 26 and the detection electrodes 27 extending along the traces 25 (the Y-axis direction). Light also reflects off the tapered surfaces TF of the edges of the slits 31 included in the driving electrodes 26 and the detection electrodes 27. Such three types of reflected light are seen with a similar level and are less likely to be recognized as a specific pattern. Accordingly, the pattern of the driving electrodes 26 and the detection electrodes 27 is less likely to be seen by a user of the liquid crystal display device 10 and the touch panel 12. FIG. 8 schematically illustrates planar arrangement of the components made of the light transmissive conductive film and the slits 31 are not described in FIG. 8. Configurations of the slits 31 will be described in detail.

As illustrated in FIGS. 9 and 10, each slit 31 has a planar shape bent repeatedly in a zigzag shape following the shape of the traces 25 and has bending portions 31a. The bending portion 31a of the slit 31 has a bending angle that is substantially same as the bending angle of the bending portions of the traces 25. The driving electrodes 26 and the detection electrodes 27 include the slits 31, respectively, along the X-axis direction at intervals. A direction in which the slits 31 are arranged corresponds with a direction in which the traces 25 are arranged. The slits 31 included in the driving electrodes 26 are not communicated with other slits 31 included along the X-axis direction and are independent (separated) from each other. Similarly, the slits 31 included in the detection electrodes 27 are not communicated with the slits 31 included along the X-axis direction and are independent (separated) from each other. Compared to a configuration in which the slits are communicated with each other, a disconnected portion is less likely to be generated in the driving electrodes 26 and the detection electrodes 27. Therefore, electric resistance is maintained to be low in the driving electrodes 26 and the detection electrodes 27.

As illustrated in FIG. 11, each slit 31 has a width SW1 that is equal to an interval LC1 between the adjacent traces 25 included in the trace group 25G. The trace group 25G includes the traces 25 at an equal interval LC1. Light reflects off the tapered surfaces TF of the edges of the slits 31 included in the driving electrodes 26 and the detection electrodes 27. Light also reflects off the tapered surfaces TF of the outer edges of all the traces 25 included in the trace group 25G. According to the above configuration, such two types of reflected light are seen with a similar level and are less likely to be recognized as a specific pattern. The interval SC1 between the adjacent slits 31 (a part of the driving electrode 26 and the detection electrode 27 and the part between the adjacent slits 31) is equal to a line width LW1 of the trace 25 included in the trace group 25G. Specifically, the interval SC1 between the adjacent slits 31 is equal to the line width LW1 of the trace 25 that has a greatest line width among the traces 25 having different line widths included in the trace group 25G. Light reflects off the tapered surfaces TF of the edges of the slits 31 included in the driving electrodes 26 and the detection electrodes 27. Light also reflects off the tapered surfaces TF of the outer edges of the trace 25 having the greatest line width LW1 of the traces 25 included in the trace group 25G. According to the above configuration, such two types of reflected light are seen with a similar level and are less likely to be recognized as a specific pattern. Accordingly, the pattern of the driving electrodes 26 and the detection electrodes 27 is less likely to be seen.

As illustrated in FIGS. 9 and 10, in addition to the driving electrodes 26 and the detection electrodes 27, the dummy electrodes 30 include the above-structured slits 31. The dummy electrodes 30 include the slits 31 so that a pattern of the dummy electrodes 30 is less likely to be seen by a user. Similar to the slits 31 included in the driving electrodes 26 and the detection electrodes 27, the slits 31 included in the dummy electrodes 30 have a planar shape bent repeatedly in a zigzag shape following the shape of the traces 25 and bending portions have a bending angle that is substantially same as the bending angle of the bending portions of the traces 25. The dummy electrodes 30 includes the slits 31 that are disposed in the X-axis direction at intervals and are not communicated with other slits 31 that are disposed in the X-axis direction, and the slits 31 are independent (separated) from each other. Compared to a configuration in which the slits are communicated with each other, a disconnected portion is less likely to be generated in the dummy electrodes 30. As described before, the dummy electrodes 30 have different short-side dimensions according to a position thereof in the Y-axis direction. Therefore, as described in FIG. 9, the dummy electrode 30 that is disposed close to the touch panel flexible board 24 and has a relatively smaller short-side dimension has a smaller number of the slits 31. As described in FIG. 10, the dummy electrode 30 that is disposed farther from the touch panel flexible board 24 and has a relatively greater short-side dimension has a greater number of the slits 31. As described in FIG. 11, each slit 31 included in the dummy electrode 30 has the width SW1 that is equal to the width SW1 of the slit 31 formed in the driving electrode 26 and the detection electrode 27, and the interval SC1 between the adjacent slits 31 included in the dummy electrode 30 is equal to the interval SC1 between the slits 31 formed in the driving electrode 26 and the detection electrode 27. According to such a configuration, the pattern of the dummy electrodes 30 is less likely to be seen similarly to the pattern of the driving electrodes 26 and the detection electrodes 27.

As described before, the touch panel (the position input device) 12 of this embodiment includes the trace group 25G, the driving electrodes 26, and the detection electrodes 27. The trace group 25G includes the traces 25 that are made of the light transmissive conductive film and are disposed at intervals. The driving electrodes 26 and the detection electrodes 27 are made of the light transmissive conductive film and are electrodes disposed adjacent to the trace group 25G and including the slits 31 extending along the traces 25.

The traces 25, and the driving electrodes 26 and the detection electrodes 27, which are electrode portion, are made of the light transmissive conductive film, and the traces 25, the driving electrodes 26, and the detection electrodes 27 include the outer edges that may have tapered surfaces TF generated during manufacturing. External light may reflect off the tapered surfaces TF, and the reflected light reflecting off the tapered surfaces TF of the outer edges of the driving electrodes 26 and the detection electrodes 27, which are the electrode portion, may be recognized as the pattern of the driving electrodes 26 and the detection electrodes 27, which are the electrode portion. The driving electrodes 26 and the detection electrodes 27, which are the electrode portion, include the slits 31 and the outer edges around the slits 31 of the driving electrodes 26 and the detection electrodes 27, which are the electrode portion, may have tapered surfaces TF similarly to the outer edges or the driving electrodes 26 and the detection electrodes 27. Therefore, external light reflects off the tapered surfaces TF of the outer edges of the driving electrodes 26 and the detection electrodes 27, which are the electrode portion, and the external light also reflects off the tapered surfaces TF of the outer edges around the slits 31. Accordingly, the light reflecting off the tapered surfaces TF of the outer edges of the driving electrodes 26 and the detection electrodes 27, which are the electrode portion, is less likely to be seen. The slits 31 included in the driving electrodes 26 and the detection electrodes 27, which are the electrode portion, extend along the traces 25. Light reflects off the tapered surfaces TF of the outer edges of the traces 25 included in the trace group 25G. Light also reflects off the tapered surfaces TF of the outer edges of the driving electrodes 26 and the detection electrodes 27, which are the electrode portion, the tapered surfaces TF following the traces 25. Light also reflects off the tapered surfaces TF of the edges of the slits 31 included in the driving electrodes 26 and the detection electrodes 27, which are the electrode portion. Such three types of reflected light are seen with a similar level and are less likely to be recognized as a specific pattern. Accordingly, the pattern of the driving electrodes 26 and the detection electrodes 27, which are the electrode portion, is less likely to be seen by a user of the touch panel 12.

The driving electrodes 26 and the detection electrodes 27, which are the electrode portion, include the slits 31 at intervals and the slits 31 are separated from each other. According to such a configuration, compared to a configuration in which the slits are communicated with each other, a disconnected portion is less likely to be generated in the driving electrodes 26 and the detection electrodes 27, which are the electrode portion. Therefore, electric resistance is maintained to be low in the driving electrodes 26 and the detection electrodes 27, which are the electrode portion.

Each slit 31 included in the driving electrodes 26 and the detection electrodes 27, which are the electrode portion, has the width SW1 that is equal to the interval LC1 between the adjacent traces 25 included in the trace group 25G. Light reflects off the tapered surfaces TF of the edges of the slits 31 included in the driving electrodes 26 and the detection electrodes 27, which are the electrode portion. Light also reflects off the tapered surfaces TF of the outer edges of the traces 25 included in the trace group 25G and disposed at the interval LC1 that is same as the width SW1 of the slit 31. According to the above configuration, such two types of reflected light are seen with a similar level and are less likely to be recognized as a specific pattern. Accordingly, the pattern of the driving electrodes 26 and the detection electrodes 27, which are the electrode portion, is less likely to be seen.

The slits 31 included in the driving electrodes 26 and the detection electrodes 27, which are the electrode portion, are disposed at intervals and the interval between the adjacent slits 31 is equal to the line width LW1 of the trace 25 included in the trace group 25G. Light reflects off the tapered surfaces TF of the edges of the slits 31 included in the driving electrodes 26 and the detection electrodes 27, which are the electrode portion. Light also reflects off the tapered surfaces TF of the outer edges of one of the traces 25 included in the trace group 25G, the one trace 25 having the line width LW1 that is equal to the interval SC1 between the adjacent slits 31. According to the above configuration, such two types of reflected light are seen with a similar level and are less likely to be recognized as a specific pattern. Accordingly, the pattern of the driving electrodes 26 and the detection electrodes 27, which are the electrode portion, is less likely to be seen.

The trace group 25G includes the traces 25 having different line widths. The interval SC1 between the adjacent slits 31 included in the driving electrodes 26 and the detection electrodes 27, which are the electrode portion, is equal to the line width LW1 of the trace 25 having the greatest width. Light reflects off the tapered surfaces TF of the edges of the slits 31 included in the driving electrodes 26 and the detection electrodes 27, which are the electrode portion. Light also reflects off the tapered surfaces TF of the outer edges of the trace 25 having the greatest line width LW1 among the traces 25 included in the trace group 25G. According to the above configuration, such two types of reflected light are seen with a similar level and are less likely to be recognized as a specific pattern.

The trace group 25G includes the traces 25 each having a planar shape extending with being bent in a zigzag shape. The slits 31 included in the driving electrodes 26 and the detection electrodes 27, which are the electrode portion, have a planar shape having the bending portions 31a. The traces 25 included in the trace group 25G have the planar shape extending with being bent in a zigzag shape. With such a configuration, in the touch panel 12 used in combination with the liquid crystal display device 10, the touch panel 12 is less likely to be in contact with the display pixels included in the liquid crystal panel 11 and moire is less likely to occur. Further, the traces 25 include the slits 31 having the bending portions 31a following the shape of traces 25. Light reflecting off the tapered surfaces TF of the outer edges of the traces 25, and light also reflects off the tapered surfaces TF of the edges around the slits 31 included in the driving electrodes 26 and the detection electrodes 27, which are the electrode portion. According to the above configuration, such two types of reflected light are seen with a similar level and are less likely to be recognized as a specific pattern. Accordingly, the pattern of the driving electrodes 26 and the detection electrodes 27 is less likely to be seen.

The electrode portion includes the driving electrodes 26 and the detection electrodes 27. The driving electrodes 26 are connected to any of the traces 25 included in the trace group 25G and generate electric fields. The detection electrodes 27 are disposed adjacent to the driving electrodes 26 and detect the electric fields generated from the driving electrodes 26. The driving electrodes 26 and the detection electrodes 27 include the slits 31. According to such a configuration, the driving electrode 26 included in the electrode portion is connected to any one of the traces 25 included in the trace group 25G and generate the electric field. The electric field generated by the driving electrodes 26 is detected by the detection electrodes 27 included in the electrode portion. If a user of the touch panel 12 puts his/her finger closer to the driving electrodes 26 and the detection electrodes 27, which are the electrode portion, for inputting a position, a part of the electric field generated by the driving electrodes 26 is absorbed by the finger. As a result, the intensity of the electric field detected by the detection electrode 27 is changed and the input position is obtained based on the change in the electric field. The detection electrodes 27 and the driving electrodes 26 included in the electrode portion include the slits 31, respectively, and the pattern of the detection electrodes 27 and the pattern of the driving electrodes 26 are less likely to be seen by a user.

The driving electrodes 26 and the detection electrodes 27 are arranged along the traces 25. The dummy electrodes 30 that are made of the light transmissive conductive film are arranged between the trace group 25G and the driving electrodes 26, and the dummy electrodes 30 include the slits 31. According to such a configuration, the traces 25 included in the trace group 25G are sequentially connected to the respective driving electrodes 26 arranged along the traces 25. Therefore, the number of the traces 25 included in the trace group 25G is gradually decreased from the basal end side toward the distal end side in the extending direction of the traces 25. The dummy electrodes 30 made of the light transmissive conductive film are arranged between the trace group 25G and the driving electrodes 26. Therefore, if the number of the traces 25 included in the trace group 25G is decreased at the distal end side of the traces 25, an empty space generated as a result of the decrease of the number of the traces 25 is filled with the dummy electrodes 30. Accordingly, unevenness in transmitted light is less likely to occur. The dummy electrodes 30 also include the slits 31 similar to the driving electrodes 26 and the detection electrodes 27 so that the pattern of the dummy electrodes 30 is less likely to be seen by a user.

The driving electrodes 26 are arranged adjacent to the trace group 25G with respect to the arrangement direction of the traces 25 (the X-axis direction). The detection electrodes 27 are arranged adjacent to the driving electrodes 26 and on an opposite side from the trace group 25G with respect to the arrangement direction. The driving electrodes 26 and the detection electrodes 27 are formed such that a part of the outer edges thereof is along the outer edges of the traces 25 and the slits 31 extend along the outer edges of the traces 25. Light reflects off the tapered surfaces TF of the outer edges of the driving electrodes 26 and the detection electrodes 27 along the outer edges of the traces 25. Light also reflects off the tapered surfaces TF of the outer edges of the traces 25 included in the trace group 25G. Light also reflects the tapered surfaces TF of the edges of the slits 31 included in the driving electrodes 26 and the detection electrodes 27. According to the above configuration, such three types of reflected light are seen with a similar level and are less likely to be recognized as a specific pattern. Accordingly, the pattern of the driving electrodes 26 and the detection electrodes 27 is less likely to be seen by a user of the touch panel 12.

The liquid crystal display device 10 of this embodiment includes the touch panel 12, and the liquid crystal panel (the display panel) 11 that is disposed opposite the touch panel 12 and on an inner side with respect to the touch panel 12. According to such a liquid crystal display device 10, an input position on an image on the liquid crystal display 11 input by a user is detected by the touch panel 12. The touch panel 12 is arranged on an external side with respect to the liquid crystal panel 11. Therefore, if external light reflects off the tapered surfaces TF of the outer edges of the driving electrodes 26 and the detection electrodes 27, which are the electrode portion, the reflected light is likely to be directly seen by the user of the liquid crystal display device 10. However, the driving electrodes 26 and the detection electrodes 27, which are the electrode portion, include the slits 31. Therefore, the pattern of the driving electrodes 26 and the detection electrodes 27, which are the electrode portion, is less likely to be seen by the user and display quality is improved.

Second Embodiment

A second embodiment will be described with reference to FIGS. 13 to 18. The second embodiment does not include the short-circuit traces 28 and the ground traces 29 of the first embodiment and include a trace group 125G and electrodes 126, 127, 130 having different patterns from those of the first embodiment. Similar configurations, operations, and effects to the first embodiment will not be described. In FIGS. 13, 14, 15 and 17, areas where the light transmissive conductive film is disposed are illustrated with shading and patterns of the shading differ between the trace group 125G, the driving electrodes 126, the detection electrodes 127, and the dummy electrodes 130.

Figure 13:
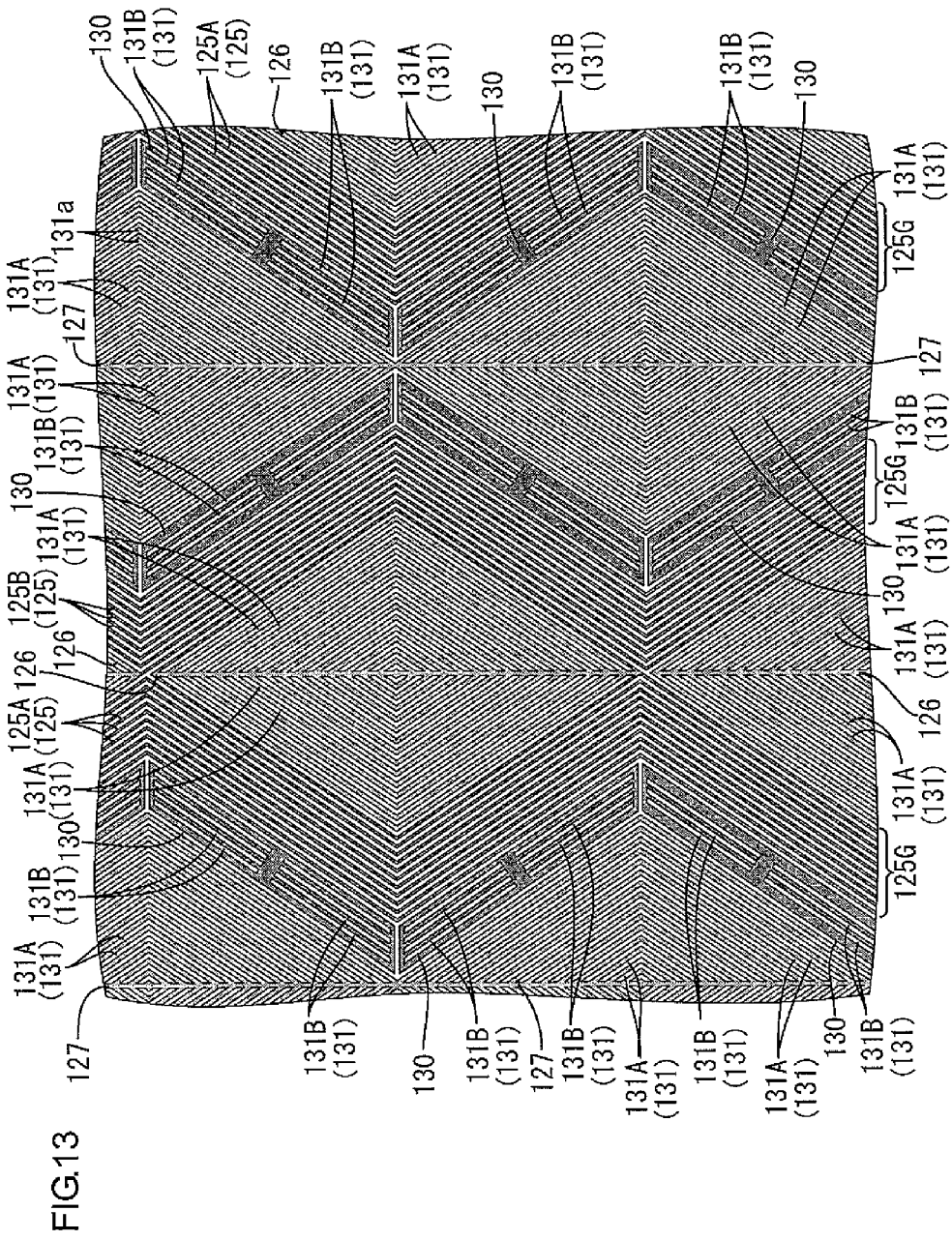
FIG. 13 is a plan view illustrating a planar configuration of each trace and each electrode portion in an area from which traces are extended (near the touch panel flexible board) on a touch panel according to a second embodiment of this invention.

As illustrated in FIG. 13, the driving electrodes 126 and the detection electrodes 127 of this embodiment have a vertically elongated diamond plan view shape. The diamond shape has a short-axis direction (an extending direction of a short diagonal line) corresponding with the X-axis direction and a long-axis direction (an extending direction of a long diagonal line) corresponding with the Y-axis direction. Angles of four corners included in the driving electrode 126 in a plan view correspond with respective angles of four corners included in the detection electrode 127 in a plan view. The driving electrode 126 and the detection electrode 127 have plan view outer shapes that are similar figures. The driving electrode 126 and the detection electrode 127 have substantially same long-axis dimensions and have substantially same short-axis dimensions. Namely, the driving electrode 126 and the detection electrode 127 have substantially same plan view outer shapes. The driving electrodes 126 and the detection electrodes 127 are arranged in the Y-axis direction and in a staggered arrangement with respect to the Y-axis direction so that outer edges thereof are parallel to each other. The adjacent driving electrode 126 and the detection electrode 127 are shifted from each other with respect to the Y-axis direction by approximately a half of the long-axis dimension of the driving electrode 126 and the detection electrode 127. Therefore, the adjacent driving electrodes 126 and the detection electrodes 127 are arranged in a zigzag arrangement two dimensionally to fill the touch area TA. The driving electrodes 126 that are adjacent to each other in the Y-axis direction are not connected to each other and are physically separated from each other. The detection electrodes 127 that are adjacent to each other in the Y-axis direction are directly connected to each other at edge portions thereof in the long-axis direction. Therefore, the detection electrodes 127 that are arranged in the Y-axis direction are electrically connected to each other directly without having the short-circuit traces 28 of the first embodiment. The detection electrodes 127 that are adjacent to each other in the Y-axis direction are directly connected to each other and the outer shape thereof is slightly different from that of the driving electrodes 126.

As illustrated in FIG. 13, the trace group 125G is disposed between the driving electrode 126 and the detection electrode 127. More in detail, the trace group 125G is disposed adjacent to the driving electrode 126 and the dummy electrode 130, which will be described later. The traces 125 included in the trace group 125G have a planar shape extending with being bent repeatedly in a zigzag shape along the outer edges of the driving electrodes 126 and the detection electrodes 127. The traces 125 have bending portions bent at a bending angle that is substantially equal to an angle of the corner of the driving electrode 126 and the detection electrode 127 with respect to the short-axis direction in a plan view. The bending angle of the bending portions of the traces 125 is relatively greater than the bending angle of the bending portions of the traces 25 of the first embodiment. The traces 125 included in the trace group 125G are disposed to sandwich the driving electrode 126 therebetween with respect to the X-axis direction, and one of the traces 125 adjacent to the driving electrode 126 is connected to the driving electrode 126. The traces 125 included in the trace group 125G have a substantially same line width LW2 and the interval LC2 between the adjacent traces 125 is substantially constant (see FIGS. 15 and 17). The traces 125 included in the trace group 125G include first traces 125A and second traces 125B. The first traces 125A are adjacent to the driving electrodes 126 arranged in the Y-axis direction and the first traces 125A are on one side (on a left side in FIG. 13) with respect to the driving electrodes 126 in the X-axis direction. The second traces 125B are adjacent to the driving electrodes 126 and on another side (on a right side in FIG. 13) with respect to the driving electrodes 126 in the X-axis direction. The first traces 125A are connected to odd-numbered driving electrodes 126 or even-numbered driving electrodes 126 from an edge of the driving electrodes 126 in the Y-axis direction. The second traces 125B are connected to even-numbered driving electrodes 126 or odd-numbered driving electrodes 126 from the edge of the driving electrodes 126 in the Y-axis direction. The driving electrodes 126 arranged in the Y-axis direction are alternately connected to the first trace 125A that is on the one side with respect to the X-axis direction and the second trace 125B that is on the other side with respect to the X-axis direction.

Figure 14:
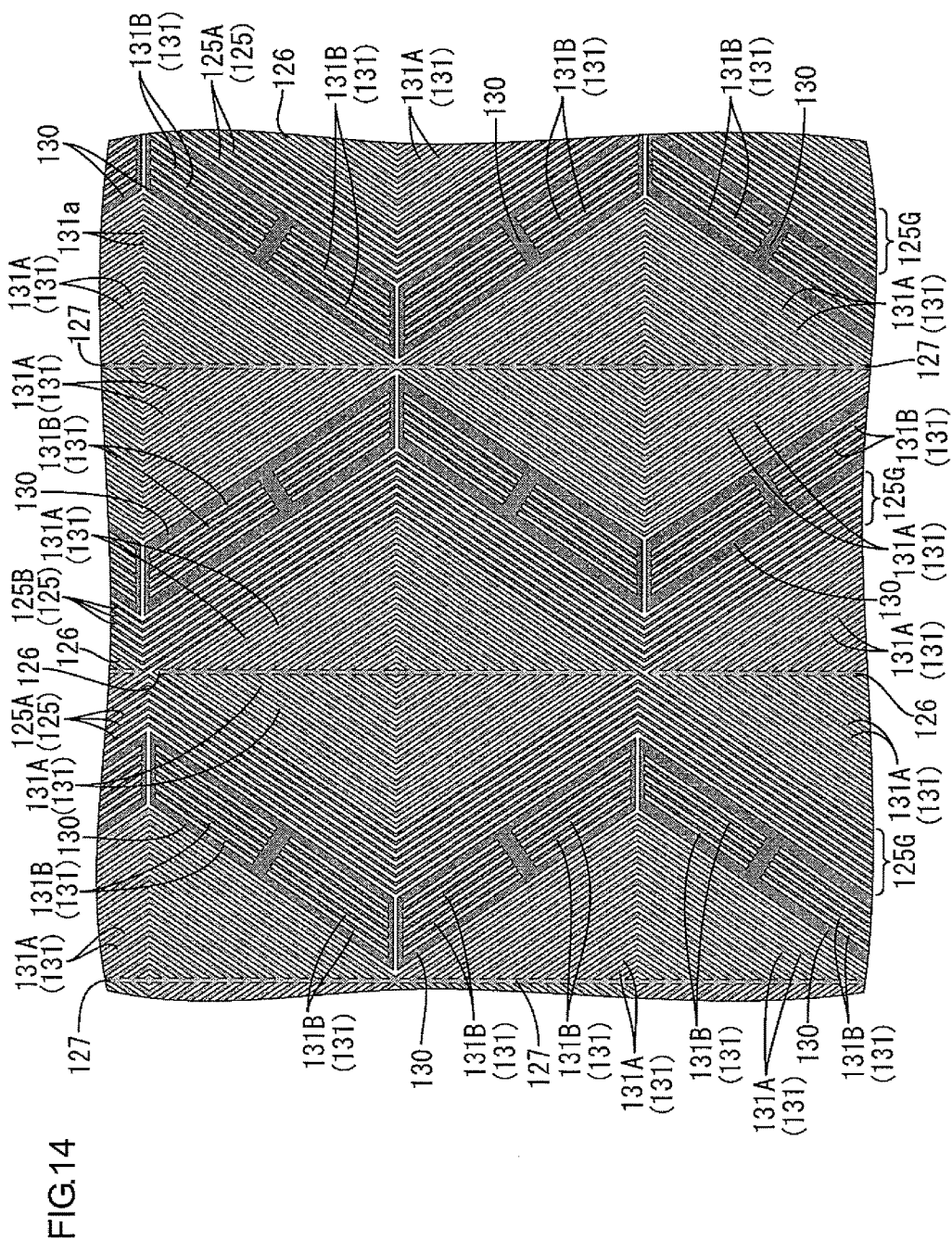
FIG. 14 is a plan view illustrating a planar configuration of each trace and each electrode portion in the area to which traces are extended (away from the touch panel flexible board).

As illustrated in FIG. 13, the dummy electrodes 130 are arranged between the driving electrodes 126 and the detection electrodes 127 and specifically, the dummy electrodes 130 are arranged adjacent to each of the trace group 125G and the detection electrodes 127. The dummy electrode 130 has an elongated rectangular shape extending along the outer edges of the traces 125 and the detection electrodes 127. The dummy electrode 130 has a length that is substantially equal to a half of one side of the detection electrode 127 and two dummy electrodes 130 are arranged to correspond with every side of each detection electrode 127. As illustrated in FIGS. 13 and 14, the dummy electrodes 130 arranged in the Y-axis direction have a short-side dimension that is changed according to a position thereof in the Y-axis direction. The short-side dimension is smaller as is closer to a touch panel flexible board, which is not illustrated (on a lower side in FIGS. 13 and 14), and the short-side dimension is greater as is farther away from the touch panel flexible board (on au upper side in FIGS. 13 and 14). The reasons of providing the different short-side dimensions of the dummy electrodes 130 that are arranged in the Y-axis direction are same as those described in the first embodiment. The dummy electrodes 130 have different short-side dimensions as described above and therefore, positional relation between the driving electrodes 126 and the detection electrodes 127 in the X-axis direction is maintained constant regardless of the position in the Y-axis direction and spaces between the driving electrodes 126 and the trace group 125G are not correspond to the light transmissive conductive film non-forming area. Thus, unevenness in brightness is less likely to occur.

Figure 15:
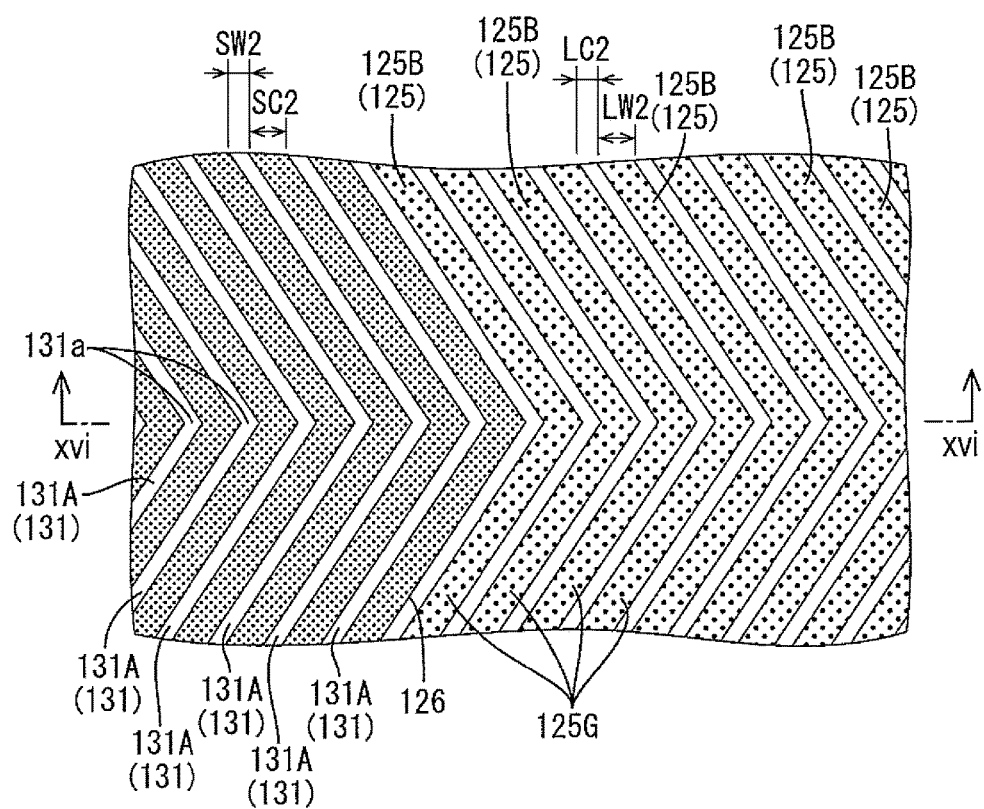
FIG. 15 is an enlarged plan view illustrating a planar configuration of the traces and the driving electrode of the touch panel.
Figure 17:
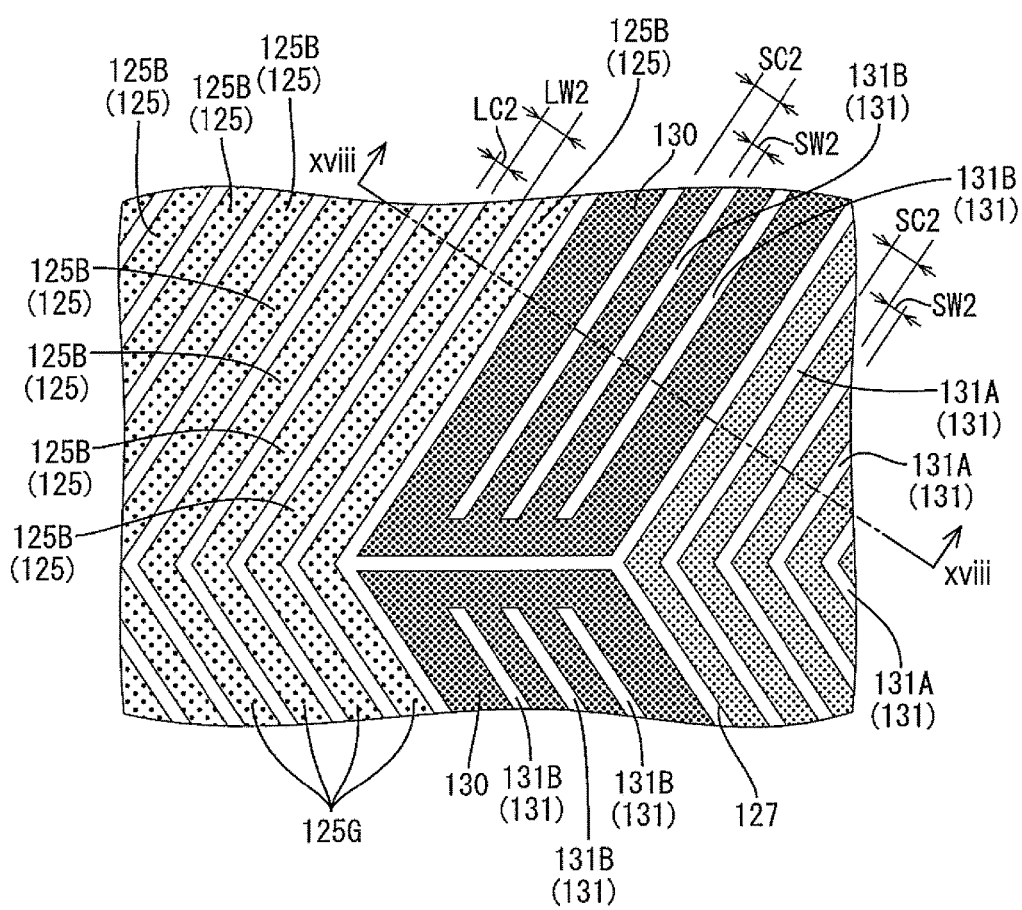
FIG. 17 is an enlarged plan view illustrating a planar configuration of traces, a detection electrode, and a dummy electrode on a touch panel.

As illustrated in FIGS. 13 and 14, the driving electrodes 126, the detection electrodes 127, and the dummy electrodes 130 include slits 131. The slits 131 included in the driving electrodes 126, the detection electrodes 127, and the dummy electrodes 130 extend along the traces 125 included in the trace group 125G. As illustrated in FIGS. 15 and 17, each slit 131 has a width SW2 that is equal to an interval LC2 between the adjacent traces 125 included in the trace group 125G. The slits 131 are arranged at an interval SC2 that is substantially equal to a width LW2 of the trace 125 included in the trace group 125G. The adjacent slits 131 are away from each other in a direction crossing an extending direction thereof by the interval SC2. The interval SC2 corresponds to a width of the driving electrode 126, the detection electrode 127 or the dummy electrode 130 between the adjacent slits 131. The slits 131 include first slits (sensor electrode slits) 131A and second slits (dummy electrode slits) 131B. The first slits 131A are included in the driving electrodes 126 and the detection electrodes 127. The second slits 131B are included in the dummy electrodes 130.

As illustrated in FIGS. 13 and 14, the first slits 131A extend an area ranging over adjacent two sides of the driving electrode 126 or the detection electrode with respect to the Y-axis direction. The first slit 131A includes only one bending portion 131a in a middle portion thereof and has a plan view V-shape. The first slit 131A includes a bending portion 131a having a bending angle that is substantially same as the bending angle of the bending portion of the trace 125 (an angle of a corner of the driving electrode 126 and the detection electrode 127 with respect to the short-axis direction in a plan view). The first slits 131A included in the driving electrode 126 or the detection electrode 127 are arranged in a left and right symmetrical plan view shape with respect to a middle portion of the driving electrode 126 or the detection electrode 127 in the short-axis direction (the X-axis direction). The first slits 131a are arranged symmetrically with a symmetrical line along the Y-axis passing through the middle portion of the driving electrode 126 or the detection electrode 127. With such a configuration, the driving electrode 126 and the detection electrode 127 include a non-slit forming portion in the middle portion with respect to the short-axis direction. No first slit 131A is included in the non-slit forming portion and the non-slit forming portion extends straight along the symmetrical line and in the Y-axis direction. The first slits 131A are arranged at intervals in the driving electrode 126 and the detection electrode 127. The adjacent first slits 131A have different lengths but have the bending portions 131a having the same bending angle and they have similar figures. The adjacent first slits 131A are not continuous to each other and are independent (separated) from each other. The first slits 131A included in the driving electrode 126 or the detection electrode 127 have a smaller length as is closer to the middle portion of the driving electrode 126 or the detection electrode 127 with respect to the short-axis direction, and have a greater length as is closer to an outer edge of the driving electrode 126 or the detection electrode 127.

As illustrated in FIGS. 13 and 14, the second slits 131B extend substantially straight along the long-side outer edge of the dummy electrodes 130 and include no bending portions 131a as are included in the first slits 131A. The second slit 131B has a length that is smaller than a half of a long-side dimension of the dummy electrode 130. Two second slits 131B are arranged along the long-side outer edge of the dummy electrode) 130. The second slits 131B are arranged at intervals in the short-side outer edge of the dummy electrode 130. The second slits 131B that are adjacent to each other along the short-side outer edge of the dummy electrode 130 are independent (separated) from each other.

Figure 16:
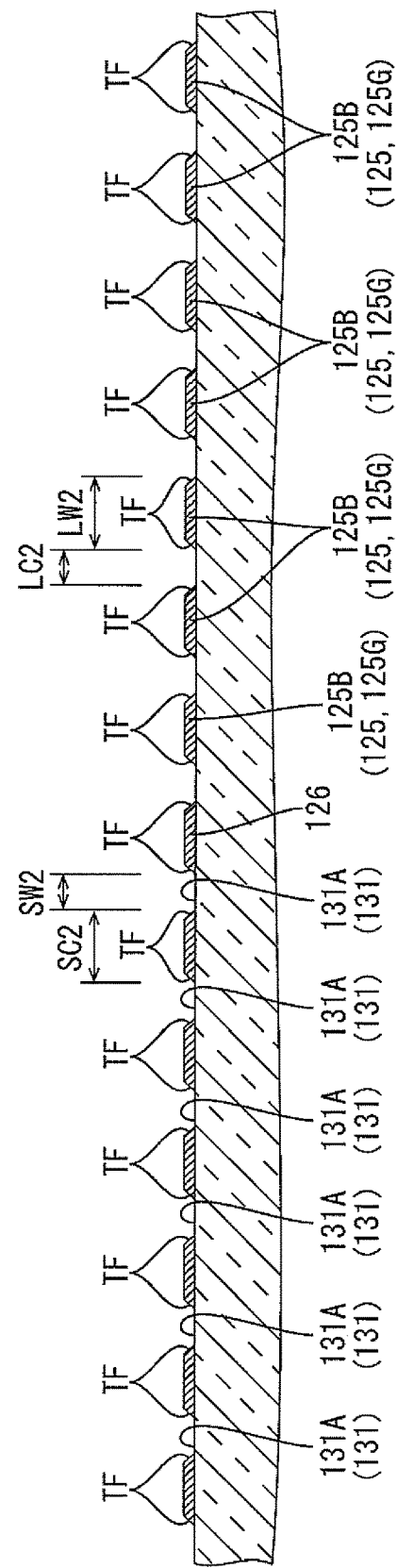
FIG. 16 is a cross-sectional view taken along line xvi-xvi in FIG. 15.
Figure 18:
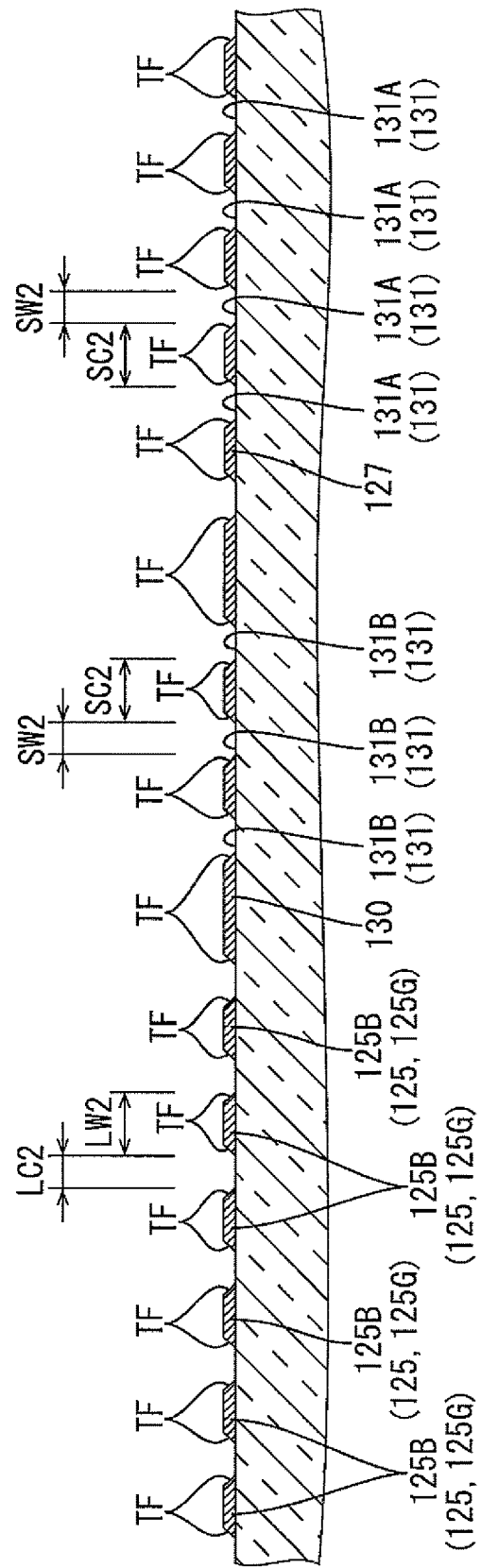
FIG. 18 is a cross-sectional view taken along line xviii-xviii in FIG. 17.

Thus, the driving electrodes 126, the detection electrodes 127, and the dummy electrodes 130 include the slits 131. The driving electrodes 126, the detection electrodes 127, and the dummy electrodes 130 include outer edges around the slits 131 and as illustrated in FIGS. 16 and 18, the outer edges around the slits 131 have tapered surfaces TF generated during manufacturing similarly to the outer edges or the driving electrodes 126, the detection electrodes 127, and the dummy electrodes 130. Therefore, external light reflects off the tapered surfaces TF of the outer edges of the driving electrodes 126, the detection electrodes 127, and the dummy electrodes 130, and the external light also reflects off the tapered surfaces TF of the outer edges around the slits 131 included in the driving electrodes 126, the detection electrodes 127, and the dummy electrodes 130. Accordingly, the light reflecting off the tapered surfaces TF of the outer edges of the driving electrodes 126, the detection electrodes 127, and the dummy electrodes 130 is less likely to be seen. The slits 131 included in the driving electrodes 126, the detection electrodes 127, and the dummy electrodes extend along the traces 125 included in the trace group 125G. Light reflects off the tapered surfaces TF of the outer edges of the traces 125 included in the trace group 125G. Light also reflects off the tapered surfaces TF of the outer edges of the driving electrodes 126, the detection electrodes 127, and the dummy electrodes 130 extending along the traces 125. Light also reflects off the tapered surfaces TF of the edges of the slits 131 included in the driving electrodes 126, the detection electrodes 127, and the dummy electrodes 130. Such three types of reflected light are seen with a similar level and are less likely to be recognized as a specific pattern. Accordingly, the pattern of the driving electrodes 126, the detection electrodes 127, and the dummy electrodes 130 is less likely to be seen by a user.

As is described before, according to this embodiment, the driving electrodes 126 and the detection electrodes 127 have a diamond plan view shape and are adjacent to each other so that the outer edges thereof are parallel to each other. The trace group 125G is disposed between the driving electrodes 126 and the detection electrodes 127. The traces 125 have a plan view shape extending with being bent repeatedly in a zigzag shape along the outer edges of the driving electrodes 126 and the detection electrodes 127. The driving electrodes 126 and the detection electrodes 127 are formed so that the slits 131 have a plan view shape having the bending portions 131a. External light reflects off the tapered surfaces TF of the outer edges of the driving electrodes 126 and the detection electrodes 127 each having a diamond plan view shape, and the external light also reflects off the tapered surfaces TF of the outer edges of the traces 125 having a plan view shape extending with being bent in a zigzag shape along the outer edges of the driving electrodes 126 and the detection electrodes 127. Light also reflects off the tapered surfaces TF of the edges of the slits 131 included in the driving electrodes 126 and the detection electrodes 127. Such three types of reflected light are seen with a similar level and are less likely to be recognized as a specific pattern. Accordingly, the pattern of the driving electrodes 126 and the detection electrodes 127 is less likely to be seen by a user.

Third Embodiment

A third embodiment will be described with reference to FIG. 19. In the third embodiment, a slit 231 has a width SW3 that differs from that in the first embodiment. Similar configurations, operations, and effects to the first embodiment will not be described.

Figure 19:
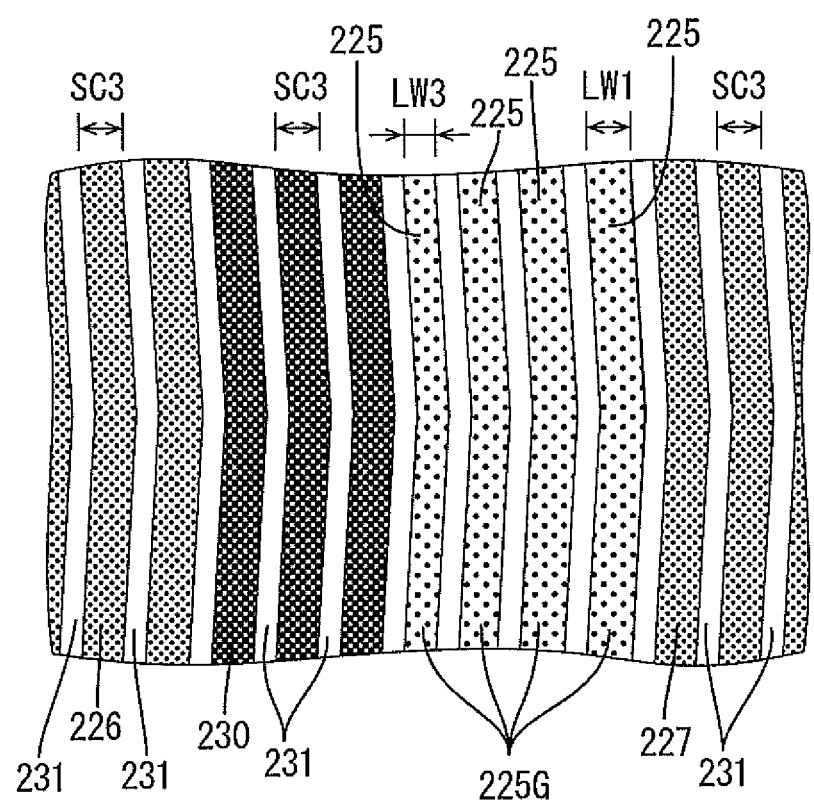
FIG. 19 is an enlarged plan view illustrating a planar configuration of traces, a driving electrode, and a detection electrode on a touch panel according to a third embodiment of this invention.

As illustrated in FIG. 19, the slits 231 of this embodiment are arranged at an interval SC3 having a value LW4 that is intermediate between the greatest line width LW1 and the smallest line width LW3 among traces 225 included in a trace group 225G. As described before, the traces 225 included in the trace group 225G have a smaller line width as is closer to the driving electrodes 226 that are to be connected (on the left side in FIG. 19) and have a greater line width as is farther away from the driving electrodes 226 that are to be connected (on the right side in FIG. 19). In FIG. 19, the trace group 225G includes four traces 225. In FIG. 19, a left-end side trace 225 in the trace group 225G is closer to the driving electrode 226 and has the smallest line width LW3 and a right-end side trace 225 in the trace group 225G is far away from the driving electrode 226 and has the greatest line width LW1. The slits 231 included in the driving electrodes 226, the detection electrodes 227, and the dummy electrodes 230 are disposed at an interval SC3 that is equal to the value LW4. The value LW4 is an intermediate value obtained by adding the smallest line width LW3 and the greatest line width LW1 (LW1+LW3) and dividing the value (LW1+LW3) by two. With such a configuration, light reflecting off tapered surfaces (not illustrated) of the edges around the slits 231 included in the driving electrodes 226, the detection electrodes 227, and the dummy electrodes 230 and light reflecting off the tapered surfaces of the outer edges of the traces 225 included in the trace group 225G are seen with a similar level and are less likely to be recognized as a specific pattern. Accordingly, the pattern of the driving electrodes 226, the detection electrodes 227, and the dummy electrodes 230 is less likely to be seen by a user.

As described before, according to this embodiment, the trace group 225G includes the traces 225 having different line widths and the driving electrodes 226 and the detection electrodes 227 (the dummy electrodes 230), which are the electrode portion, are formed so that the interval SC3 between the adjacent slits 231 is equal to the value LW4 that is between the smallest line width LW3 and the greatest line width LW1 among the traces 225 having different line widths. According to such a configuration, light reflecting off the tapered surfaces around the slits 231 included in the driving electrodes 226 and the detection electrodes 227 (the dummy electrodes 230), which are the electrode portion, and light reflecting off the tapered surfaces of the outer edges of the traces 225 included in the trace group 225G are seen with a similar level and are less likely to be recognized as a specific pattern. Accordingly, the pattern of the driving electrodes 226 and the detection electrodes 227 (the dummy electrodes 230), which are the electrode portion, is less likely to be seen by a user.

Other Embodiments

The present invention is not limited to the embodiment described above with reference to the drawings and the following embodiments may be included in the technical filed of the present invention.

(1) In each of the above embodiments, the traces included in the trace group have a zigzag planar shape and the slits have a planar shape bent according to the zigzag shape. However, the specific planar shape of the traces and the slits may be altered if necessary. For example, the traces may have a curved planar shape curved in a waveform and the slits may have a waveform planar shape accordingly. The traces have a straight planar shape extending straight and the slits may have a straight planar shape accordingly.

(2) In each of the above embodiments, the bending angle of the bending portions of the slits is equal to the bending angle of the bending portions of the traces included in the trace group. However, the bending angle of the bending portions of the slits may be different from the bending angle of the bending portions of the traces included in the trace group. Further, the specific bending angle of the bending portions of the slits may be altered if necessary, and the specific bending angle of the bending portions of the traces included in the trace group may be altered if necessary.

(3) In each of the above embodiments, each of the driving electrode, the detection electrode, and the dummy electrode includes the slits. However, one or two of the driving electrode, the detection electrode, and the dummy electrode may include the slits and the other of them may include no slits.

(4) In each of the above embodiments, all of the driving electrodes, the detection electrodes, and the dummy electrodes disposed in the touch area of the touch panel include the slits. However, a part of the driving electrodes, the detection electrodes, and the dummy electrodes disposed in the touch area may not include the slits and other parts of the driving electrodes, the detection electrodes, and the dummy electrodes may include the slits.

(5) In each of the above embodiments, the slits formed in the driving electrodes, the detection electrodes, and the dummy electrodes have substantially same width. However, the slits formed in the driving electrodes, the detection electrodes, and the dummy electrodes may have different widths.

(6) In each of the above embodiments, the driving electrodes, the detection electrodes, and the dummy electrodes include the slits that are formed at a substantially equal interval. However, the driving electrodes, the detection electrodes, and the dummy electrodes may include the slits that are formed at different intervals.

(7) In each of the above embodiments, the slits included in one of the driving electrode, the detection electrode, and the dummy electrode have a same width. However, the slits included in one of the driving electrode, the detection electrode, and the dummy electrode may have different widths according to the position thereof. For example, in the first and third embodiments, the slits included in the driving electrode have a greater width as is closer to the detection electrode and have a smaller width as is closer to the trace group. Further, the width of the slits may be changed in different ways. The interval between the adjacent slits may be changed similarly.

(8) In each of the above embodiments, the adjacent slits are not communicated with each other and are separated from each other. However, the adjacent slits may be communicated with each other. In such a configuration, some of the slits included in the same electrode portion may be connected to each other and the other slits may be separated from each other.

(9) In each of the above embodiments, the width of the slit is smaller than the interval between the adjacent slits. However, the slits may have a width greater than the interval between the adjacent slits. The width of the slit may be equal to the interval between the adjacent slits. Further, in each of the above embodiments, the line width of the traces included in the trace group is greater than the interval between the adjacent traces. However, the line width of each of the traces may be smaller than the interval between the adjacent traces. The width of the trace may be equal to the interval between the adjacent traces.

(10) In each of the above embodiments, the width of the slit is equal to the interval between the adjacent traces included in the trace group. However, the width of the slit may be different from the interval between the adjacent traces included in the trace group. In the above first and third embodiments, the interval between the adjacent slits is equal to the greatest line width or an intermediate value between the greatest line width and the smallest line width among the line widths of the traces included in the trace group. However, the interval between the adjacent slits may be equal to the smallest line width or a line width (value) between the maximum line width value and the minimum line width value among the line widths of the traces included in the trace group. The specific value of the width of the slit or the specific value of the interval between the adjacent slits may be altered if necessary.

(11) In the above first and third embodiments, the line width of the traces included in the trace group is varied according to the position thereof with respect to the X-axis direction and the interval between the adjacent traces is constant regardless of the position thereof with respect to the X-axis direction. However, the line width of each trace and the interval between the adjacent traces may be constant regardless of the position with respect to the X-axis direction. The line width of each trace and the interval between the adjacent traces may be changed according to the position thereof with respect to the X-axis direction. The interval between the adjacent traces may be changed according to the position thereof with respect to the X-axis direction and the line width of each trace may be constant regardless of the position with respect to the X-axis direction.

(12) In the above first and third embodiments, the detection electrodes are short-circuited via the short circuit traces. In the first and third embodiments, similar to the second embodiment, the adjacent detection electrodes may be directly connected to each other and may have a short-circuited configuration without having the short circuit traces. In the second embodiment, similar to the first and third embodiments, the detection electrode may be short-circuited via the short circuit traces.

(13) In the above first and third embodiments, the ground traces may not be included. In such a configuration, the driving electrodes and the detection electrodes are adjacent to each other. In the second embodiment, the ground traces may be included.

(14) In the above first and third embodiments, the driving electrode and the detection electrode are disposed in a staggered arrangement with respect to the Y-axis direction. However, the driving electrodes and the detection electrodes may not be disposed in a staggered arrangement with respect to the Y-axis direction and may be arranged in a matrix.

(15) In the above second embodiment, the line width of the traces included in the trace group and the interval between the adjacent traces are constant. However, similar to the first and third embodiments, the interval between the adjacent traces may be constant and the line width of the traces may be changed according to the position of the trace. In such a configuration, the trace connected to the driving electrode that is closer to the touch panel flexible board may have a smaller line width and the trace connected to the driving electrode that is far from the touch panel flexible board may have a greater line width. In the second embodiment, in addition to the change in the line width of the traces, the interval between the adjacent traces may be changed according to the position of the trace. In the second embodiment, the line width of the trace may be constant regardless of the position of the trace and the interval between the adjacent traces may be changed according to the position of the trace.

(16) In the configurations of the above embodiments, the dummy electrodes may not be included.

(17) In each of the above embodiments, the touch area of the touch panel corresponds to the display area of the liquid crystal panel. However, the touch area and the display area do not necessarily correspond to each other completely. For example, the touch area of the touch panel may range over the entire area of the display area of the liquid crystal panel and a part of the non-display area (a part closer to the display area).

(18) In each of the above embodiments, the liquid crystal display device includes the touch panel separately from the liquid crystal panel. However, the traces and the electrode portion may be directly disposed on an outer surface of a base board (a CF board) that is arranged on an outer side with respect to the liquid crystal panel. Namely, the base board that is the display panel may function as the base board of the position input device.

(19) In each of the above embodiments, the liquid crystal display device includes the cover panel opposite the touch panel on an outer side thereof. The cover panel may not be included and the touch panel may be an outermost component.

(20) In each of the above embodiments, the liquid crystal panel includes the color filter of three colors including red, green, and blue. However, the present invention may be applied to the configuration including the color filter of four colors including the yellow color section in addition to the red, green, and blue color sections.

(21) Each of the above embodiments is applied to the light transmissive type liquid crystal display device including the backlight device that is an external light source. The present invention may be applied to a reflection type liquid crystal display device displaying with using external light and in such a configuration, the backlight device may not be included.

(22) In each of the above embodiments, the liquid crystal display device includes a horizontally long display screen. However, the liquid crystal display device may include a vertically long display screen, and the liquid crystal display device may include a square display screen.

(23) In each of the above embodiments, the TFTs are used as the switching components of the liquid crystal panel. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(24) In each of the above embodiments, the liquid crystal display device includes the liquid crystal panel as the display panel. The present invention may be applied to display devices using other kinds of display panels (PDP (plasma display panel, organic EL panel, EPD (electrophoresis display panel)). In such a configuration, the backlight device may not be included.

EXPLANATION OF SYMBOLS

10: liquid crystal display device (display device), 11: liquid crystal panel (display panel), 12: touch panel (position input device), 25, 125, 225: trace, 25G, 125G, 225G: trace group, 26, 126, 226: driving electrode, 27, 127, 227: detection electrode, 30, 130, 230: dummy electrode, 31, 131, 132: slit, 31a, 131a: bending portion, LC1, LC2: interval, LW1-LW4: line width, SC1-SC3: interval, SW1, SW2: width

The invention claimed is:
1. A position input device comprising:
a trace group including traces arranged with an interval between the traces, the traces being made of a light transmissive conductive film; and
an electrode portion made of the light transmissive conductive film, arranged adjacent to the trace group, the electrode portion being connected to any of the traces of the trace group and including a slit extending along the traces, wherein
the slit has a width that is equal to the interval between directly adjacent ones of the traces,
the driving electrode includes driving electrodes and the detection electrode includes detection electrodes, and the driving electrodes and the detection electrodes are arranged along the traces, and
the electrode portion further includes a dummy electrode made of the light transmissive conductive film and arranged between the trace group and one of the driving electrodes and the detection electrodes, and the dummy electrode includes the slit.

2. The position input device according to claim 1, wherein the electrode portion includes slits that are arranged at an interval and separated from each other.

3. The position input device according to claim 1, wherein the electrode portion includes slits that are arranged at an interval and the interval between adjacent slits is equal to a line width of the traces included in the trace group.

4. The position input device according to claim 3, wherein the trace group includes the traces having different line widths, and
the interval between the adjacent slits included in the electrode portion is equal to a greatest one of the different line widths.

5. The position input device according to claim 3, wherein the trace group includes the traces having different line widths, and
the interval between the adjacent slits included in the electrode portion is between a smallest one of the different line widths and a greatest one of the different line widths.

6. The position input device according to claim 1, wherein each of the traces included in the trace group has a planar shape extending with being bent in a zigzag shape, and
the slit included in the electrode portion has a planar shape having bending portions.

7. The position input device according to claim 1, wherein the electrode portion includes a driving electrode and a detection electrode, the driving electrode is connected to any of the traces included in the trace group and generates an electric field, and the detection electrode is arranged adjacent to the driving electrode and detects the electric field from the driving electrode, and the driving electrode and the detection electrode include the slits.

8. The position input device according to claim 7, wherein the driving electrode is disposed adjacent to the trace group with respect to an arrangement direction in which the traces are arranged, and the detection electrode is disposed adjacent to the driving electrode with respect to the arrangement direction and on an opposite side from the trace group, and the driving electrode and the detection electrode have outer edges and a part of the outer edges is along an outer edge of the traces, and the slits included in the driving electrode and the detection electrode are along the outer edge of the traces.

9. The position input device according to claim 7, wherein each of the driving electrode and the detection electrode has a diamond planar shape and has outer edges, and the driving electrode and the detection electrode are adjacent to each other such that the outer edges thereof are parallel to each other, and the trace group is disposed between the driving electrode and the detection electrode, and the traces have a planar shape extending with being bent in a zigzag shape along the outer edges of the driving electrode and the detection electrode, and the slits included in the driving electrode and the detection electrode have bending portions.

10. A display device comprising:
the position input device according to claim 1; and
a display panel arranged opposite the position input device and on an inner side with respect to the position input device.

11. A display device comprising:
a display panel including a base board; and
the position input device according to claim 1 disposed on an outer side surface of the base board.

12. The display device according to claim 11, wherein the traces and the electrode portion are provided on the base board.

13. The display device according to claim 12, wherein an insulation film is provided between a base board, and the traces and the electrode portion.

14. The position input device according to claim 1, wherein the traces and the electrode portion are included in a same film.

* * * * *